US012570539B2

(12) United States Patent
Sagastume et al.

(10) Patent No.: US 12,570,539 B2
(45) Date of Patent: Mar. 10, 2026

(54) SYSTEMS AND METHODS FOR GENERATING RADIONUCLIDES

(71) Applicant: PERSPECTIVE THERAPEUTICS, INC., Seattle, WA (US)

(72) Inventors: Edwin A. Sagastume, Iowa City, IA (US); Michael K. Schultz, Hills, IA (US); Daniel McAlister, Downers Grove, IL (US)

(73) Assignee: PERSPECTIVE THERAPEUTICS, INC., Seattle, WA (US)

( * ) Notice: Subject to any disclaimer, the term of this patent is extended or adjusted under 35 U.S.C. 154(b) by 0 days.

(21) Appl. No.: 19/327,937

(22) Filed: Sep. 12, 2025

(65) Prior Publication Data

US 2026/0008686 A1     Jan. 8, 2026

Related U.S. Application Data

(63) Continuation of application No. 19/065,133, filed on Feb. 27, 2025, which is a continuation of application No. PCT/US2023/069474, filed on Jun. 30, 2023.

(Continued)

(51) Int. Cl.
*C01F 13/00*        (2006.01)
*B01D 15/16*        (2006.01)
(Continued)

(52) U.S. Cl.
CPC ............ *C01F 13/00* (2013.01); *B01D 15/163* (2013.01); *B01D 15/1871* (2013.01);
(Continued)

(58) Field of Classification Search
CPC ... C01F 13/00; B01D 15/163; B01D 15/1871; B01D 15/362; B01J 39/18; B01J 47/026; C01P 2006/88
See application file for complete search history.

(56) References Cited

U.S. PATENT DOCUMENTS

2020/0108348 A1      4/2020  Snow et al.
2021/0024365 A1*     1/2021  O'Hara ................ C01G 21/003
(Continued)

FOREIGN PATENT DOCUMENTS

WO        2021110950 A1      6/2021

OTHER PUBLICATIONS

Extended European Search Report dated Nov. 19, 2025.
(Continued)

*Primary Examiner* — Anthony J Zimmer
*Assistant Examiner* — Syed T Iqbal
(74) *Attorney, Agent, or Firm* — Bryan Cave Leighton Paisner LLP

(57)        ABSTRACT

Systems and methods for generating radionuclides, such as radium-224. Systems herein may include a first cartridge having a first opening, a second opening, and a chamber therebetween having a first resin having affinity for thorium-228 and bismuth-212; a second cartridge having a first opening, a second opening, and a chamber therebetween having a second resin having affinity for thorium-228 and bismuth-212, a third cartridge having a first opening, a second opening, and a chamber therebetween comprising a third resin having affinity for thorium-228 and bismuth-212, a fourth cartridge having a first opening, a second opening, and a chamber therebetween having a third resin having affinity for lead-212; wherein a continuous flow path is formed from a top of the first cartridge though the second cartridge, through the third cartridge, and to a bottom of the fourth cartridge during system use.

8 Claims, 14 Drawing Sheets

Related U.S. Application Data

(60) Provisional application No. 63/402,906, filed on Aug. 31, 2022.

(51) Int. Cl.
| | |
|---|---|
| *B01D 15/18* | (2006.01) |
| *B01D 15/36* | (2006.01) |
| *B01J 39/18* | (2017.01) |
| *B01J 47/026* | (2017.01) |

(52) U.S. Cl.
CPC ............ *B01D 15/362* (2013.01); *B01J 39/18* (2013.01); *B01J 47/026* (2013.01); *C01P 2006/88* (2013.01)

(56) References Cited

U.S. PATENT DOCUMENTS

| | | |
|---|---|---|
| 2022/0013246 A1 | 1/2022 | Torgue et al. |
| 2025/0368525 A1 | 12/2025 | Sagastume et al. |
| 2025/0372274 A1 | 12/2025 | Sagastume et al. |

OTHER PUBLICATIONS

McAlister et al. "Chromatographic generator systems for the actinides and natural decay series elements," Radiochim. Acta 99, 151-159 2011.

International Search Report and Written Opinion for PCT/US23/69474 dated Feb. 15, 2024.

\* cited by examiner

① Th/Ra separation
② Th Recovery
③ Th Storage
④ Ra Loading
⑤ Ra acid rinse
⑥ Ra water rinse A: TEVA Resin
B: TRU Resin
D: Pb Resin
E: Pre-filter Resin
F: MP-50 Resin
G: MP-50 Resin Guard Column ① Th/Ra separation ② Th Recovery ③ Th Storage ④ Ra Loading ⑤ Ra acid rinse ⑥ Ra water rinse A: TEVA Resin B: TRU Resin C: Monophos D: Pb Resin E: Pre-filter Resin F: MP-50 Resin G: MP-50 Resin Guard Column

403

403

332

F: Ra filled MP-50 resin
G: Non-radioactive MP-50
resin guard column

| Date of Manufacture | Nov. 3, 2021 | Dec. 8, 2021 | Jan. 12, 2022 |
|---|---|---|---|
| Batch # | 20211103-01 | 20211208-01 | 20220112-01 |
| Radioactivity (Ra-224) | 16 mCi | 16 mCi | 22.5 mCi |
| Ra-224 Purity | >99.99% | >99.99% | >99.99% |
| Th-228 Content (Th-228/Ra-224%) | 0.024 µCi (0.0002%) | 0.016 µCi (0.0001%) | 0.006 µCi (0.00003%) |

| Date of Manufacture | 24AUG2022 | 25AUG2022 | 27SEP2022 |
|---|---|---|---|
| Batch # | VMT236IN22A | VMT237IN22A | VMT270IN22A |
| Radioactivity (Ra-224) | 30.76 mCi | 37.47mCi | 30.76 mCi |
| Ra-224 Purity | >99.9999% | >99.9999% | >99.9999% |

| Batch # | 20211103-01 | 20211208-01 | 20220112-01 |
|---|---|---|---|
| Radioactivity (Ra-224) | 15.9 mCi | 15.8 mCi | 22.5 mCi |
| Elution # | Ra-224 Breakthrough | | |
| 1 | 0.0006% | 0.0021% | 0.0019% |
| 2 | 0.0008% | 0.0019% | 0.0002% |
| 3 | 0.0007% | 0.0019% | 0.00004% |
| 4 | 0.0007% | 0.0089% | 0.00003% |
| 5 | 0.0007% | 0.0012% | 0.0002% |
| 6 | 0.0006% | 0.0013% | 0.00003% |
| 7 | 0.0009% | 0.0014% | 0.00003% |
| 8 | 0.0008% | 0.0016% | 0.0008% |
| 9 | 0.0010% | 0.0036% | 0.0003% |
| 10 | 0.0001% | 0.0070% | 0.0003% |
| 11 | 0.0011% | N/A | N/A |
| 12 | 0.0004% | N/A | N/A |

FIG. 11C

| Batch # | 20211103-01 | 20211208-01 | 20220112-01 |
|---|---|---|---|
| Elution # | Elution Efficiency | | |
| 1 | 98.13% | 99.7% | 84.3% |
| 2 | 100% | Not Tested | 97.5% |
| 3 | Not Tested | 99.5% | 95.2% |
| 4 | Not Tested | 95.8% | 96.3% |
| 5 | Not Tested | 98.8% | 100% |
| 6 | Not Tested | 93.8% | 92.6% |
| 7 | Not Tested | 98.7% | 94.8% |
| 8 | Not Tested | 90.9% | 99.9% |
| 9 | Not Tested | 99.9% | 96.0% |
| 10 | 100% | 95.4% | 94.5% |

FIG. 11D

| Batch # | VMT236IN22A | VMT237IN22A | VMT270IN22A |
|---|---|---|---|
| Elution # | Ra-224 Breakthrough (Ra/Ra) | | |
| 1 | 0.0000169 | 0.0000643 | 0.0000075 |
| 2 | 0.0000050 | 0.0000280 | 0.0000022 |
| 3 | 0.0000156 | 0.0000282 | 0.0000042 |
| 4 | 0.0000292 | 0.0000038 | 0.0000063 |
| 5 | 0.0000617 | 0.0000347 | 0.0000158 |
| 6 | 0.0001071 | 0.0000672 | 0.0000281 |
| 7 | 0.0001955 | 0.0001218 | 0.0000466 |
| 8 | 0.0004165 | 0.0002410 | 0.0000850 |
| 9 | 0.0007757 | 0.0004666 | 0.0001661 |
| 10 | 0.0012360 | 0.0010415 | 0.0002728 |

FIG. 11E

| Batch # | VMT236IN22A | VMT237IN22A | VMT270IN22A |
|---|---|---|---|
| Elution # | Elution Efficiency | | |
| 1 | 96.99% | 99.51% | 96.54% |
| 2 | 97.07% | 99.72% | 98.26% |
| 3 | 96.89% | 101.50% | 96.89% |
| 4 | 87.35% | NC | 97.08% |
| 5 | 98.15% | 99.67% | 99.10% |
| 6 | 98.54% | 97.99% | 97.70% |
| 7 | 98.14% | 98.36% | 97.21% |
| 8 | 99.48% | 97.86% | 97.19% |
| 9 | 96.64% | 97.82% | 96.65% |
| 10 | 97.76% | 97.26% | 97.46% |

NC = not collected

FIG. 11F

SYSTEMS AND METHODS FOR GENERATING RADIONUCLIDES

CROSS REFERENCE TO RELATED APPLICATIONS

This application is a continuation of U.S. patent application Ser. No. 19/065,133, filed Feb. 27, 2025, which is a continuation of International Application No. PCT/US2023/069474, filed Jun. 30, 2023, which claims the benefit of and priority to U.S. Provisional Patent Application No. 63/402,906, filed Aug. 31, 2022. The entire contents of the above applications are incorporated by reference as if recited in full herein.

STATEMENT AS TO FEDERALLY SPONSORED RESEARCH

This invention was made with government support under R44CA250872 and R44CA254613, awarded by the U.S. National Institutes of Health/National Cancer Institute. The government has certain rights in the invention.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

This disclosure relates generally to the field of nuclear medicine and more particularly to systems and methods for obtaining and separating radionuclides (radioactive atoms) and radioactive materials for use in nuclear medicine, molecular imaging, and radiopharmaceuticals. The radionuclides and radioactive materials may be especially useful for delivery of radiation to specific organs, tissues, or cells (e.g., cancerous tumors, cancer cells, malignant lesions) within the body for therapy, diagnosis, and monitoring of disease.

BACKGROUND

Nuclear medicine uses radioactive atoms, referred to as radionuclides or isotopes or radioisotopes, for diagnosis and treatment. Radionuclides used for these purposes can be attached to ligands (e.g., peptides, antibodies, small molecules) that direct them specifically to targeted tissues (e.g., cancerous tumors) or in some cases are delivered as an unattached chemical entity (e.g., $^{223}$Ra as a chloride that targets cancer that has metastasized to bone). Often, these radionuclides are generated from relatively long-lived isotopes, referred to as parent isotopes, that decay to form short-lived isotopes, referred to as daughter isotopes. A daughter isotope is suitable for use for diagnosis and treatment. In many cases, the parent isotope is not suitable for use and the daughter isotope must be separated from the parent isotope prior to daughter isotope use to ensure a highly pure chemical entity is employed for radiopharmaceutical therapies and diagnosis of disease in humans. This is also the case for preclinical development research and development to ensure the products that are ultimately employed for human use are appropriately developed.

Generating and separating the daughter isotope from the parent isotope presents a number of challenges and safety concerns. Parent isotopes decay into multiple daughter isotopes, only one (or a subset) of which may be useful. The daughter and parent isotopes have to be sufficiently different from one another to be chemically separable. The daughter and parent isotopes are radioactive and thus present a potential hazard to manufacturing personnel exposed to the material. The length of time it takes parent isotopes to decay is determined by their radioactive half-life and cannot be readily controlled. A daughter isotope also decays with its own physical half-life and after it decays, it is no longer useful for diagnosis and treatment. Thus, it can be challenging to deliver a therapeutic daughter isotope to a medical facility while it is still in a useful form and prior to it decaying to levels that are no longer useful. While various methods have been utilized to obtain daughter isotopes for use, problems still arise. Thus, there is a need for improved methods and systems for separating and isolating isotopes. Described herein are improved methods and systems for obtaining and separating isotopes that may address these and other problems.

SUMMARY OF THE DISCLOSURE

The present invention relates to the development of methods and systems for separating and isolating radionuclides for use in nuclear medicine, radiopharmaceuticals, therapeutics, and diagnostic applications.

For example, described herein are systems including: a first cartridge having a first opening, a second opening, and a chamber therebetween having a first resin having affinity for thorium-228 and bismuth-212; a second cartridge having a first opening, a second opening, and a chamber therebetween including a second resin having affinity for thorium-228 and bismuth-212, wherein the second cartridge is distinct from the first cartridge; in some examples the system may include a third cartridge having a first opening, a second opening, and a chamber therebetween including a third resin having affinity for thorium-228 and bismuth-212, wherein the third cartridge is distinct from the second cartridge; and a fourth cartridge having a first opening, a second opening, and a chamber therebetween including a third resin having affinity for lead-212; wherein a continuous flow path is formed from a top of the first cartridge though the second cartridge, through the third cartridge, and to a bottom of the fourth cartridge during system use.

Any of these systems may include a conduit configured to form the flow path between the second cartridge and third cartridge. Any of these systems may include a frit at the bottom opening of the first cartridge.

In general, the first resin may include an aliphatic quaternary amine. In some examples the first resin includes TEVA resin. The first resin may include particles of 50-100 μm.

The second resin may include octylphenyl-N,N-diisobutyl carbamoylphosphine oxide (CMPO) dissolved in tri-n-butyl phosphate (TBP).

The third resin may include monophos resin.

In some examples the second ion exchange resin includes N,N,N',N'-tetra-n-octyldiglycolamide (DGA Resin, Normal) and/or N,N,N',N'-tetra-2-ethylhexyldiglycolamide (DGA Resin, Branched). The second resin may include TRU resin. The second resin may include particles of 50-100 μm.

In some examples the fourth resin may include crown ether dissolved in alcohol. For example, the fourth resin may include 18-crown-6 dissolved in alcohol. In some examples the fourth resin includes Pb resin or Sr resin.

Any of these systems may include a pump configured to create a partial vacuum or a pressure in the continuous flow path to draw a fluid from the top of the first cartridge through the bottom of the fourth cartridge. Any of these systems may include a controller configured to control a pump partial vacuum or pressure.

In some examples the first cartridge further includes thorium-228 and bismuth-212, the second cartridge further includes thorium-228 and bismuth-212, the third cartridge further includes thorium-228 and bismuth-212, and the fourth cartridge includes lead-212.

Any of these systems may include a fifth cartridge in line at a bottom of the fourth cartridge, wherein the fifth cartridge is configured to trap organic materials.

The systems described herein may include a source vial fluidically connected to the top opening of the first cartridge, wherein the source vial includes thorium-228, radium-224, bismuth-212, and lead-212.

Any of these systems may include a collection vial fluidically in line with a bottom of the fourth cartridge. The systems described herein may include a collection vial fluidically in line with a bottom of the fourth cartridge, wherein the collection vial includes radium-224.

Also described herein are methods. For example a method may include loading a composition having thorium-228, radium-224, bismuth-212, and lead-212 onto a first cartridge; absorbing thorium-228 and bismuth-212 to a first resin in the first cartridge; flowing radium-224 and lead-212 and residual thorium-228 and bismuth-212 through the first cartridge and into a second cartridge, wherein the second cartridge is fluidically connected to the first cartridge; absorbing the residual thorium-228 and bismuth-212 to a second resin in the second cartridge; optionally flowing radium-224 and lead-212 and residual thorium-228 and bismuth-212 through the second cartridge and into a third cartridge, wherein the third cartridge is fluidically connected to the first cartridge; absorbing the residual thorium-228 and bismuth-212 to a third resin in the third cartridge; flowing the radium-224 and lead-212 through the third cartridge and into a fourth cartridge, wherein the fourth cartridge is fluidically connected to the third cartridge; absorbing the lead-212 to a fourth resin in the fourth cartridge: and flowing the radium-224 through the fourth cartridge and into a collection vial, wherein the collection vial is fluidically connected to the fourth cartridge.

The method may include, before flowing the radium-224 into the collection vial, flowing the radium-224 through a pre-filter column and absorbing contaminants onto the pre-filter column. The composition may include an oxoacid. The composition may include an oxoacid selected from the group consisting of $HClO$, $HNO_3$, and $H_3PO_4$. The composition may have not more than 2.5 M $HNO_3$. In some examples the composition includes not more than 4 M HCl.

Any of these methods may include creating, with a pump, a partial vacuum or a pressure between the first cartridge and the third cartridge to thereby draw a fluid of the composition from a top of the first cartridge through a bottom of the third cartridge in a continuous flow path. A controller may control the pump.

For example, a method for reducing resin degradation may include loading a composition including $^{224}Ra$ onto a resin in a cartridge; absorbing the $^{224}Ra$ to the resin in the cartridge; and distributing the radioactivity throughout the cartridge, such that at least 10% of the $^{224}Ra$ is in the bottom two-fifths of resin in the cartridge. In some examples no more than 15% of the $^{224}Ra$ is in the bottom two-fifths of resin in the cartridge. In some examples no more than 20% of the $^{224}Ra$ is in the bottom two-fifths of resin in the cartridge. In some examples no more than 5% of the $^{224}Ra$ is in the bottom fifth of resin in the cartridge.

For example, a method for reducing resin degradation may include loading a composition having $^{224}Ra$ onto a resin in a cartridge; absorbing the $^{224}Ra$ to a resin in the cartridge; and rinsing the resin in the cartridge with a solution having a concentration of not more than 4M hydrohalic acid.

A method for reducing resin degradation may include loading a composition having $^{224}Ra$ onto a resin in a cartridge, wherein the composition is aqueous; absorbing the $^{224}Ra$ to a resin in the ion exchange cartridge; and rinsing the ion exchange cartridge with a solution having a concentration of no more than 4 M hydrochloric acid In some examples, a method for reducing resin degradation may include loading a composition having $^{224}Ra$ onto a resin in a cartridge, wherein the composition is aqueous; absorbing the $^{224}Ra$ to a resin in the ion exchange cartridge; and rinsing the ion exchange cartridge with a solution having a concentration of no less than 2 M nitric acid.

Any of these methods may include attaching a guard cartridge to a bottom of the cartridge. The guard cartridge may include a cation exchange resin. In some examples the guard column may include an MP-50 cation exchange resin. The bottom of the cartridge and the MP-50 column may be separated by a frit.

The composition may include less than 1% thorium-228. In any of these methods the composition may include less than 0.1% thorium-228. The composition may include an oxoacid selected from the group consisting of HCl, $HNO_3$, and $H_3PO_4$. The composition may include not more than 2.5 M $HNO_3$. The composition may include not more than 2.25 M $HNO_3$.

Any of these methods may include rinsing the ion exchange cartridge with a solution having a concentration of at least 2 M hydrohalic acid. Rinsing may include rinsing with a hydrohalic acid selected from the group consisting of HCl, HBr, and HI.

In any of these methods the composition may include no more than 4 M HCl. The ion exchange cartridge may include a cation exchange. The ion exchange cartridge may include an MP-50 cation exchange.

All of the methods and apparatuses described herein, in any combination, are herein contemplated and can be used to achieve the benefits as described herein.

BRIEF DESCRIPTION OF THE DRAWINGS

A better understanding of the features and advantages of the methods and apparatuses described herein will be obtained by reference to the following detailed description that sets forth illustrative embodiments, and the accompanying drawings of which:

FIG. 1 also shows lead-212 decay chain includes the short-lived isotopes bismuth-212 (Bi-212 or $^{212}Bi$), polonium-212 (Po-212 or $^{212}Po$), and thallium-208 (Tl-208 or $^{208}Tl$), which all emit energetic particles (alpha or beta particles), as well as concomitant gamma rays during decay. The rate of decrease in the rate of emission of particles and gamma rays is dictated by the individual half-life of each radionuclide in the decay series. Complexities in the relationship between parent and daughter isotopes arise as radionuclides are separated one from another, giving rise to ingrowth and decay relationships. FIG. 1 also shows the non-radioactive and stable element lead-208 (Pb-208 or $^{208}$Pb) at the end of the decay chain. Because Pb-208 is stable, this isotope terminates this series of decays.

FIG. 4A schematically illustrates a system for an in-line process for separation of radium-224 with a series of separation cartridges for separating $^{224}$Ra away from thorium-228 and other components.

FIG. 4B schematically illustrates the system shown in FIG. 4A after separation of the radium-224 away from the other components. $^{228}$Th, $^{212}$Bi, and $^{208}$Tl are captured by one set of capture cartridges (cartridge A, cartridge B, cartridge C) and $^{212}$Pb is captured by another capture cartridge (cartridge D). Organic components and/or other contaminants are captured by another capture cartridge (cartridge E). The $^{224}$Ra is not captured by the capture cartridges and flows through the cartridges and is collected.

FIG. 4C illustrates experimental results showing that that little or no radioactive thorium escapes from the first set of capture cartridges (cartridge A, cartridge B) shown in FIGS. 4A-4B when thorium is loaded onto the first set of capture cartridges and analyzed for breakthrough.

FIG. 6A schematically illustrates a set-up for use in radioactive thorium recovery. Arrows indicate the direction of fluid flow for radioactive thorium recovery or storage.

FIG. 6B schematically illustrates recovery and storage of radioactive thorium from capture cartridges and separating the radioactive thorium away from other nuclides using the system and method shown in FIG. 6A.

FIG. 6C illustrates results from experiments analyzing recovery of radioactive thorium from capture cartridges illustrated in the system and method shown in FIGS. 6A-6B.

FIGS. 8A-8D show experimental results from analyzing radioactive nuclides from columns handled using the methods illustrated in FIG. 7. FIG. 8A shows conditions useful for controlling distribution of radioactive radium along the length of a 0.5 mL generator column, such as the one illustrated in FIG. 7.

FIG. 8B shows conditions useful for preventing breakthrough (loss) of radioactive radium from a 0.5 mL generator column, such as the one illustrated in FIG. 7.

FIG. 8C shows conditions for preventing breakthrough (loss) of radioactive radium from a 0.3 mL generator column, such as the one illustrated in FIG. 7.

FIG. 8D shows conditions useful for controlling distribution of radioactive radium along the length of a 0.3 mL generator column, such as the one illustrated in FIG. 7. Radioactive distribution along the length of a column can reduce column damage and improve column re-usability.

FIG. 10B shows results from a distribution constants (Kd) analysis for different radionuclides on an MP-50 generator column as a function of different concentrations of hydrochloric acid (HCl). The differing distribution constants allow for selective collection of Pb-212 and its daughters from the generator MP-50 column while Ra-224 remains trapped within the generator MP-50 resin in the column.

FIG. 11C shows results from experimental analyses of multiple batches of radium obtained from radioactive thorium using the systems and methods (e.g., FIG. 2) described herein showing low levels of breakthrough of radioactive $^{224}$Ra.

FIG. 11D shows results from experimental analyses of multiple batches of radium obtained from radioactive thorium using the systems and methods (e.g., FIG. 3) described herein showing excellent $^{224}$Ra yield and purity.

FIG. 11E shows results from experimental analyses of multiple batches of radium obtained from radioactive thorium using the systems and methods described herein (e.g., FIG. 2) showing high $^{212}$Pb elution efficiency.

FIG. 11F shows results from experimental analyses of multiple batches of radium obtained from radioactive thorium using the systems and methods (e.g., FIG. 3) described herein showing high $^{212}$Pb elution efficiency.

FIG. 12A schematically illustrates a "hot resin" loading method in which resin containing "hot" (radioactive) material is loaded onto a cartridge that contains cold resin at the bottom.

FIG. 12B shows a "liquid loading" method in which a "hot" (radioactive) solution is loaded onto a cartridge that has been pre-filled with "cold" (non-radioactive) resin. "Hot" resin is not loaded. A guard column with "cold" (non-radioactive) resin is added in line.

DETAILED DESCRIPTION

Described herein are systems and methods for obtaining, separating, storing radionuclide material (radioactive atoms). The obtained and separated radionuclide material may be especially useful in fields such as nuclear medicine, molecular imaging, and radiopharmaceuticals. The radionuclide material may be delivered to organs, tissues, cells, extracts, or other materials of interest (e.g., cancerous tumors, cancer cells, malignant lesions, etc.) for diagnosis, therapy, and/or monitoring of disease or for another use.

Figure 1:
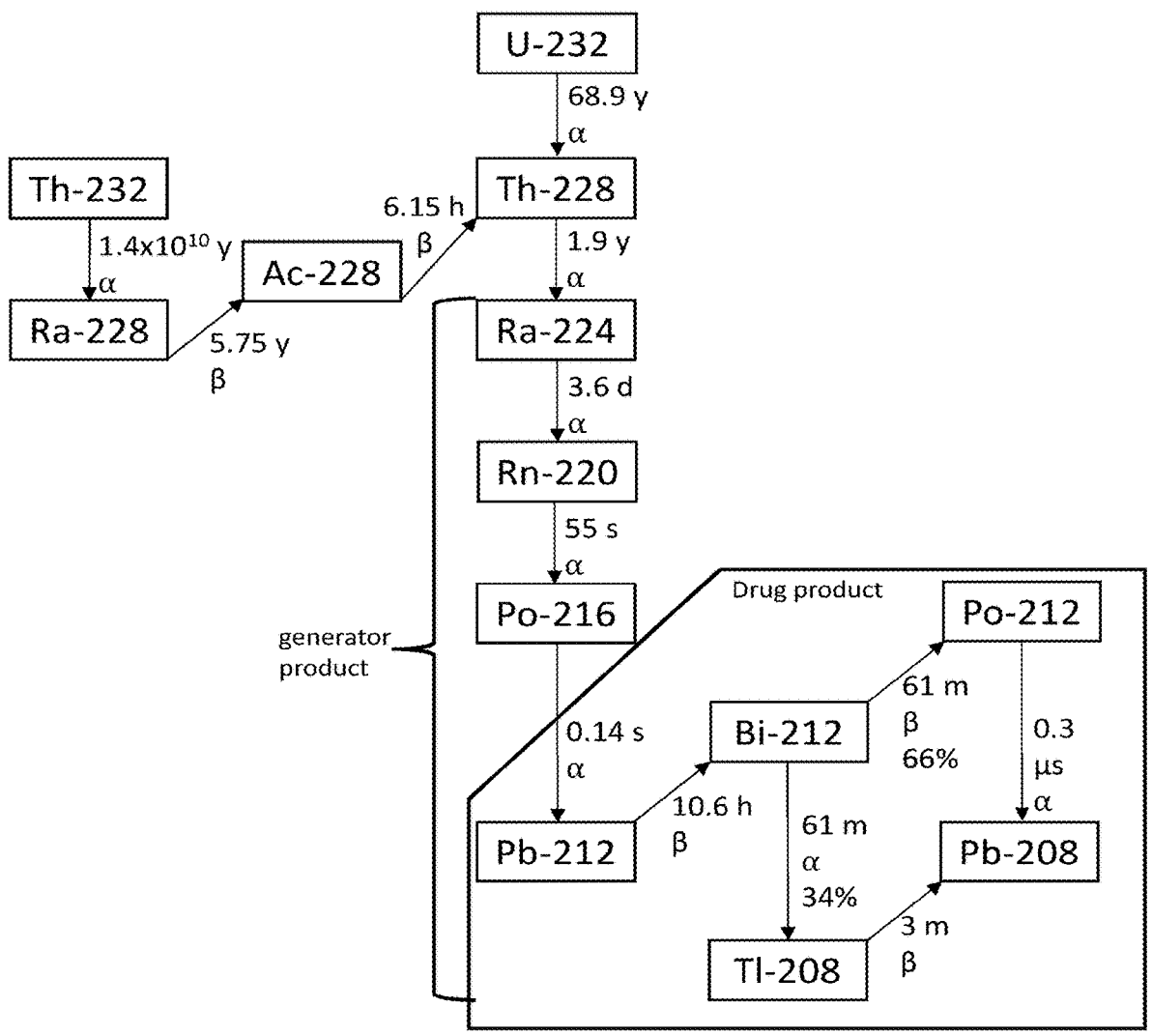
FIG. 1 is a schematic illustration of the thorium-228 (Th-228 or $^{228}Th$) radioactive decay series, illustrating production of various radioactive nuclides from it, including lead-212 (Pb-212 or $^{212}Pb$). Pb-212 can be delivered to a body for use in disease (such as cancer) treatment, diagnosis, and monitoring.
Figure 2:
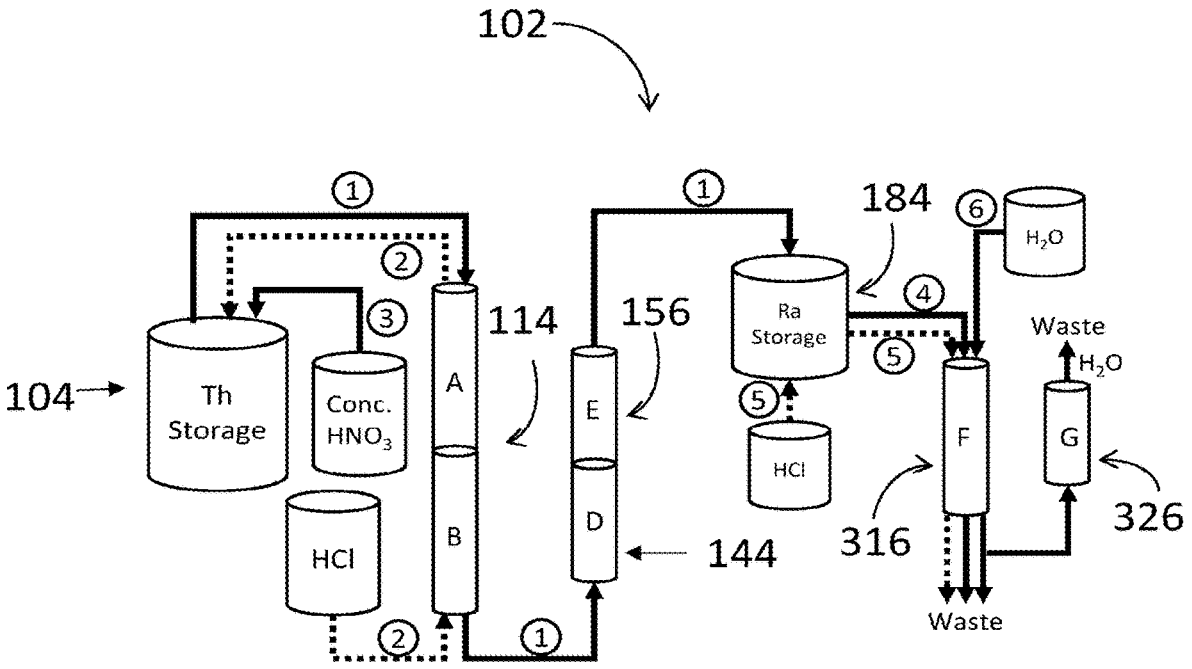
FIG. 2 illustrates a schematic view of radioisotope generator manufacturing systems and subsystems.

FIG. 1 is a schematic illustration of the thorium-228 (Th-228 or $^{228}$Th) radioactive decay series, illustrating production of various radioactive nuclides, including production of lead-212 (Pb-212 or $^{212}$Pb). Pb-212 can used for diagnosis, therapy, and/or monitoring of disease or for another use. Since the half-life of Pb-212 is relatively short (e.g., 10.6 hours), it can be advantageous for Pb-212 to be generated (from its Ra-224 parent) at or near a point of care, such as at or near a hospital, clinic, or other location at which it will be used. FIG. 1 also shows a lead-212 decay chain which includes the short-lived isotopes bismuth-212 (Bi-212 or $^{212}$Bi), polonium-212 (Po-212 or $^{212}$Po), and thallium-208 (Tl-208 or $^{208}$Tl), which all emit small energetic particles (alpha or beta particles) during decay over the course of about an hour. FIG. 1 also shows the non-radioactive and stable element lead-208 (Pb-208 or $^{208}$Pb) at the end of the decay chain. Once a radioactive atom (Pb-212) has decayed to a non-radioactive element (e.g., Pb-208), it lacks the energy to be useful for diagnosis, therapy, and/or monitoring of disease the way the parent nuclide is. A generator is a system for generating a radionuclide. A generator is based on a parent-daughter nuclidic pair wherein a relatively long-lived parent isotope (e.g., Ra-224) decays to a relatively short-lived daughter isotope suitable for use. FIG. 1 also schematically illustrates a generator product and a deliverable or drug product. A deliverable or drug product is the product useful and sufficiently safe for delivering to a patient for medical use. Described herein are manufacturing generator systems having a series of cartridges with affinities for one or more particular nuclides and methods of using the systems that may address some of the problems described above. In these systems, particular nuclides for further use in a composition containing multiple nuclides can be separated from other nuclides. FIG. 2 schematically illustrates manufacturing generator system 102. Manufacturing generator system 102 can be configured to separate radium-224 from thorium-228 and further process the radium-224 can be further processed into separated lead-212. Manufacturing generator system 102 can be configured to recycle the thorium-228 for further use.

Described herein are manufacturing systems, subsystems, and methods useful for generating the generator product and/or drug product shown in FIG. 1. The systems, subsystems, and methods may, for example, advantageously minimize personnel radiation exposure time during radionuclide manufacturing, recycle radionuclides (e.g., thorium-228) for future use, generate highly pure radium-224 (that is substantially free of thorium-228), and generate highly pure lead-212 daughter isotope (that is substantially free of parental radium-224 isotope). The systems, subsystems, and methods may allow for predictable lead-212 collection with a sufficiently stable and consistent shelf-life. The systems and subsystems may lend themselves to automatic cycling, minimizing handling time and personnel radiation exposure time. The systems, subsystems, and methods may be operated automatically and/or continuously (e.g., without requiring feed steps) and/or under control of a system of controller(s), pump(s), conduit(s), valve(s). The systems, subsystems, and methods herein may have no or minimal evaporation step(s) or feed adjustment(s) which may be otherwise be cumbersome or dangerous to manufacturing personnel. FIG. 2 schematically illustrates a radioisotope manufacturing generator system 102 for generating radioactive nuclides, such as radioactive nuclides shown in FIG. 1. FIG. 2 illustrates the generator system 102 including components including source container 104, capture assembly 114, lead capture cartridge 144, organic or pre-filter cartridge 156, collection cartridge 184. FIG. 2 also illustrates the generator system 102 including components including lead generator cartridge 316 and guard cartridge 326. FIG. 2 also illustrates the generator system 102 with other components such as solvent containers for collecting or containing solvents such as nitric acid, hydrochloric acid, and water. FIG. 2 illustrates capture assembly 114 including first capture cartridge 116 with resin A (e.g., first thorium separation resin), second capture cartridge 126 with resin B (e.g., second thorium separation resin). FIG. 2 also illustrates lead capture cartridge 144 with resin D (e.g., lead separation resin) and organic or pre-filter cartridge 156 with resin E for removing contaminants. FIG. 2 also illustrates flow paths in the form of numbered arrows in the radioisotope manufacturing generator system 2 to illustrate steps in separating and washing radionuclides. Flow paths illustrate fluid flow (radionuclides and/or solvents) to, from or through the assemblies, containers, and cartridges in radioisotope manufacturing generator system 2. Flow path 1 illustrates a thorium-radium separation flow path. Flow path 2 illustrates a thorium recovery flow path. Flow path 3 illustrates a thorium storage flow path. Flow path 4 illustrates a radium loading flow path. Flow path 5 illustrates a radium acid rinse flow path. Flow path 6 illustrates a radium water rinse flow path.

Figure 4A:
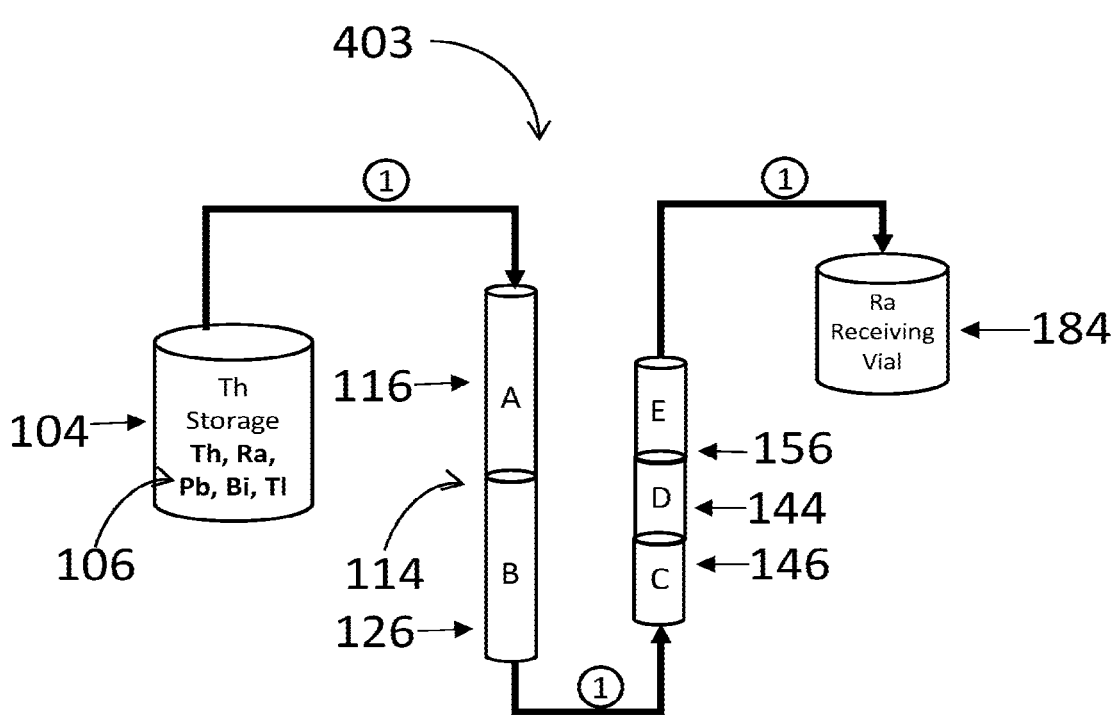
FIGS. 4A-4B schematically illustrate a system for separation of radium-224 (Ra-224 or $^{224}$Ra) from other components present during $^{228}$Th radioactive decay. Separated radium-224 can subsequently be used as starting material in a Pb generator to generate $^{212}$Pb for diagnostic, therapeutic, or monitoring uses.
Figure 4B:
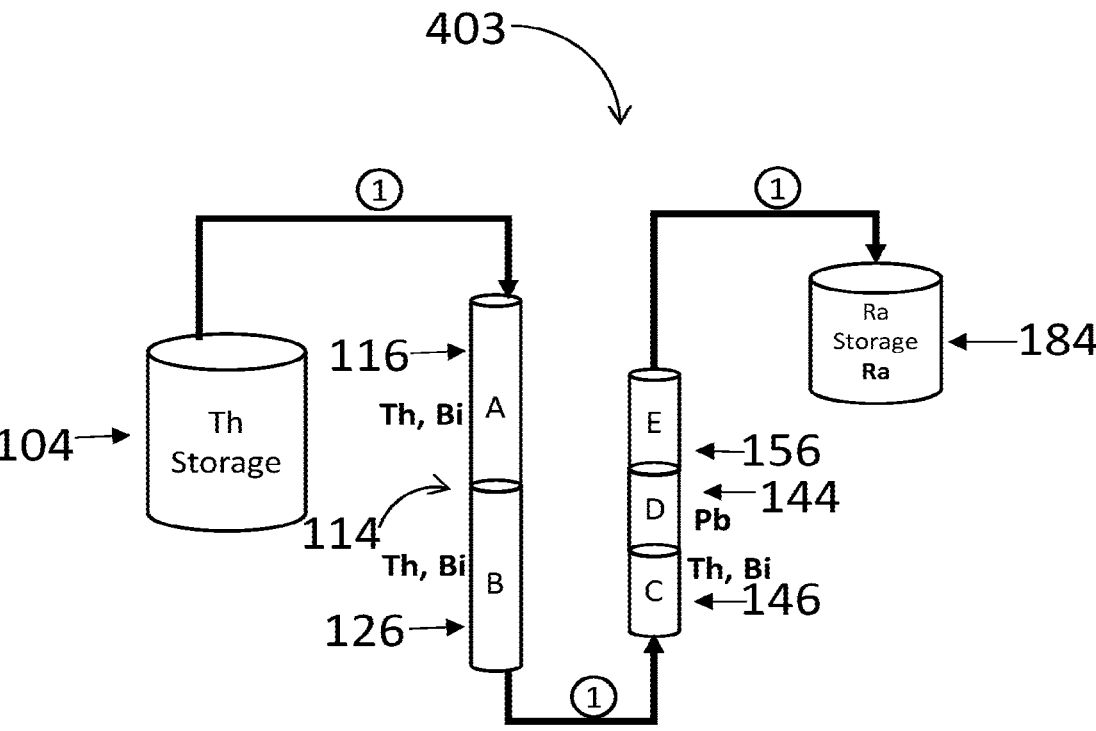

FIGS. 4A-4B schematically illustrate system 403 (a subsystem of generator system 402) for separation of radium-224 (Ra-224 or $^{224}$Ra) from other components present during $^{228}$Th radioactive decay. Separated radium-224 can subsequently be used as starting material in a Pb generator to generate $^{212}$Pb for diagnostic, therapeutic, or monitoring uses. FIG. 4A schematically illustrates a system for an in-line process, a thorium-radium separation flow path, flow path 1, for separating $^{224}$Ra away from $^{228}$Th and other components with a series of separation cartridges. Resin A in first cartridge 116 and resin B in second capture cartridge 126 have affinity for thorium ($^{228}$Th), bismuth ($^{212}$Bi), and thallium ($^{208}$Tl) and have little/no affinity for lead ($^{212}$Pb) and radium ($^{224}$Ra). Resin C in third cartridge 146 also has affinity for thorium ($^{228}$Th) and bismuth ($^{212}$Bi). Resin D in lead capture cartridge 144 has affinity for lead ($^{212}$Pb). Resin E in organic or pre-filter cartridge 156 has affinity for organic materials (e.g., organic contaminants). FIG. 4A illustrates loading a mixture of isotopes, including $^{228}$Th, $^{224}$Ra $^{212}$Bi, $^{212}$Pb, and $^{208}$Tl in a solvent, from source container 104 onto resin A in first cartridge 116. FIG. 4B schematically illustrates the system shown in FIG. 4A after separation of the radium-224 away from the other components. Thorium ($^{228}$Th), bismuth ($^{212}$Bi), and thallium ($^{208}$Tl) are captured by resin A in first capture cartridge 116. Lead ($^{212}$Pb) and radium ($^{224}$Ra) are not captured and flow through resin A in first capture cartridge 116. Second capture cartridge 126 with resin B is in-line and captures thorium ($^{228}$Th), bismuth ($^{212}$Bi), and thallium ($^{208}$Tl) that flows through first capture cartridge 116. Applicants have found that placing second capture cartridge 126 with resin B in-line results in highly purified radium. While resin A and resin B may have the same composition. Applicants have found that having the composition of resin B different from the composition of resin A can lead to particularly good results, even though both resin A and resin B capture the same nuclides (thorium ($^{228}$Th), bismuth ($^{212}$Bi), and thallium ($^{208}$Tl). In a particular example, one resin (e.g., resin A) contains TEVA® resin (Eichrom Technologies, Inc., eichrom.com) and the other resin (e.g., resin B) contains TRU resin (Eichrom Technologies, Inc., eichrom.com). After the solvent and any non-captured isotopes flow through resin B in second capture cartridge 126, they pass through resin C in third capture cartridge 146. While resin C may have the same composition as either resin A or resin B, Applicants have found that having the composition of resin C different from the composition of resin A can lead to particularly good results, even though resin A, resin B, and resin C can capture the same nuclides. After the solvent and any non-captured isotopes flow through resin C in third capture cartridge 146, they pass into lead capture cartridge 144. Resin D in lead capture cartridge 144 captures lead ($^{212}$Pb). Radium ($^{224}$Ra) is not captured by resin D in lead capture cartridge 144 and flows through lead capture cartridge 144.

After the solvent and any non-captured isotopes flow through resin D in lead capture cartridge 144, they pass into organic or pre-filter cartridge 156. Resin E in organic or pre-filter cartridge 156 captures contaminants, such as organic molecules. Radium ($^{224}$Ra) is not captured by resin E in organic or pre-filter cartridge 156 and flows through lead capture cartridge 144. Radium ($^{224}$Ra) has flowed through the cartridges and is collected in a receiving vial. The separated/collected radium ($^{224}$Ra) is highly pure. First capture cartridge 116 and second capture cartridge 126 (and/or third capture cartridge 146) can be reassembled for reuse. $^{212}$Pb in lead capture cartridge 144 can be further used or decayed and discarded. The $^{224}$Ra product in collection container 184 can be further processed, such as loaded on a cartridge for shipping and medical use.

Although FIG. 4A shows Tl being loaded onto the system 103, Tl has little affinity for the columns, the 3-minute half-life means that by the time the process is over, it has essentially disappeared from the Ra-224 source. During the processing, it will begin to grow into columns A and B due to the immediate parent (Bi) being captured there and generating new Tl. After a couple hours, it is now on column D as Pb produces Bi and eventually Tl.

Figure 4C:
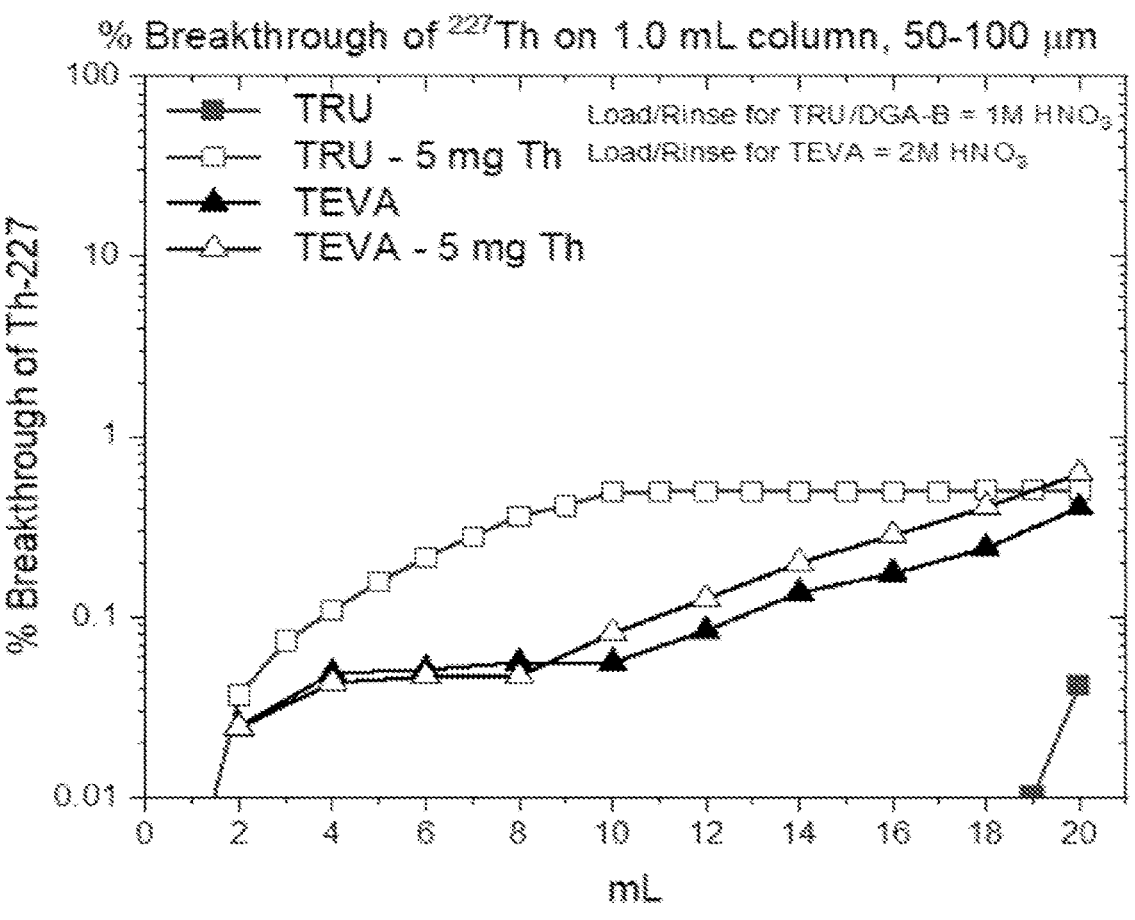
FIG. 4C shows that $^{224}$Ra separated using the system and methods shown in FIGS. 4A-4B should have little or no radioactive thorium contamination.
Figure 5:
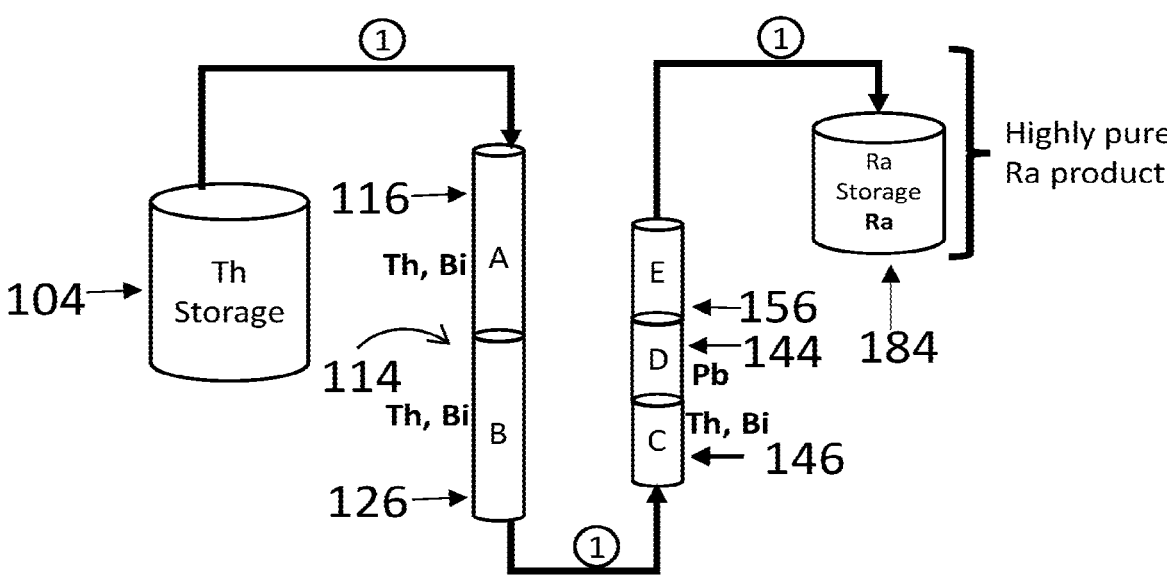
FIG. 5 schematically illustrates the system shown in FIG. 4A after separation of the $^{224}$Ra away from the other components. $^{228}$Th, $^{212}$Bi, and $^{208}$Tl are captured by one set of capture cartridges (cartridge A, cartridge B, cartridge C) and $^{212}$Pb is captured by another capture cartridge (cartridge D). Organic components and/or other contaminants are captured by another capture cartridge (cartridge E). The $^{224}$Ra is not captured by the capture cartridges and flows through the cartridges and is collected as a highly pure $^{224}$Ra product. The highly pure $^{224}$Ra product can be further processed, such as loaded onto a generator cartridge for shipping to a medical facility for local $^{212}$Pb generation for medical or other use. One or more capture cartridges (cartridge A, cartridge B, cartridge C) containing $^{228}$Th can be further processed to recover the $^{228}$Th away from the column and the recovered $^{228}$Th can subsequently be used for generating additional lots of $^{224}$Ra. $^{212}$Pb in a capture cartridge (cartridge D) can be decayed and discarded (or further used). Capture cartridges that are handled as described herein can be regenerated and reused.

FIG. 4C shows results indicating that $^{224}$Ra separated using the system and methods shown in FIGS. 4A-4B should have little or no radioactive thorium contamination. FIG. 4C illustrates experimental results showing analyses of thorium breakthrough from resin A and resin B. After loading thorium onto TEVA® resin (Eichrom Technologies, Inc., eichrom.com) and TRU resin (Eichrom Technologies, Inc., eichrom.com), the amount of thorium breakthrough (e.g., leakage of thorium off the columns) was measured. Less than 1% thorium breakthrough was observed and with use of less solvent, even less breakthrough (less than 0.7% breakthrough) was observed. FIG. 5 illustrates separation of radium into highly pure product ready for shipping to a medical facility.

Figure 6A:
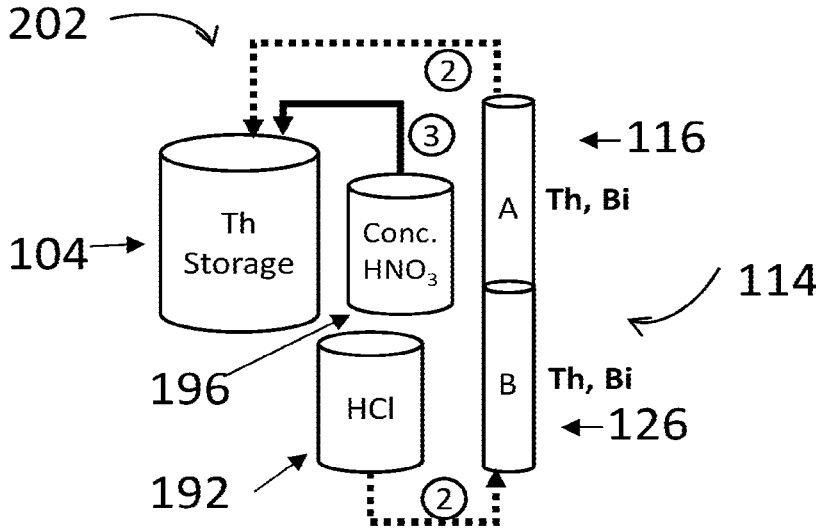
FIGS. 6A-6B schematically illustrate a system and method useful for recovery and storage of $^{228}$Th such as from the system shown in FIG. 5.
Figure 6B:
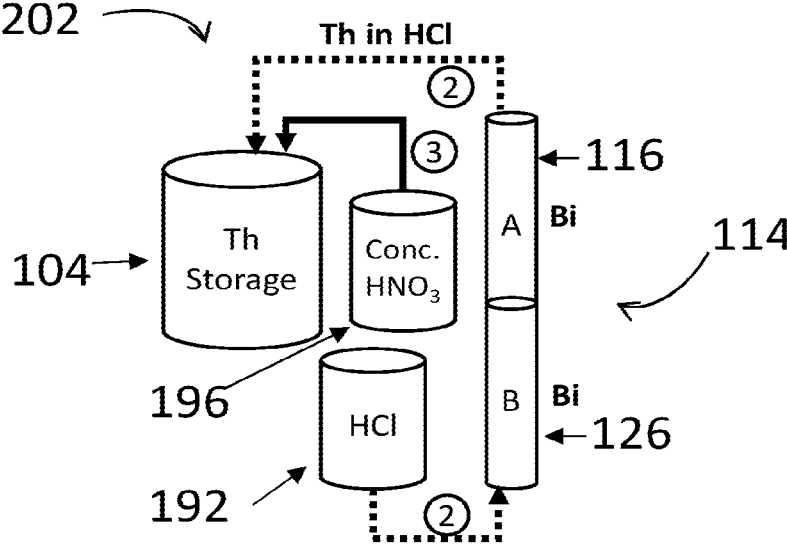

FIGS. 6A-6B schematically illustrate a system and method useful for recovery and storage of $^{228}$Th such as from the system shown in FIG. 5. FIG. 6A schematically illustrates a set-up for use in radioactive thorium recovery. Arrows indicate the direction of fluid flow for radioactive thorium recovery or storage. FIG. 6A illustrates the starting situation for radioactive thorium recovery. Thorium and bismuth left behind from the separation of radium are on first capture cartridge 116 and second capture cartridge 126 in thorium capture assembly 114. Solvent container 192 containing a recovery solvent (shown here as hydrochloric acid (HCl)) for removing thorium from first capture cartridge 116 and second capture cartridge 126 is fluidically attached to the bottom of second capture cartridge 126. Dotted arrows illustrate recovery flow path 2.

FIG. 6B schematically illustrates recovery and storage of radioactive thorium from capture cartridges and separating the radioactive thorium away from other nuclides using the system and method shown in FIG. 6A. Recovery solvent (shown here as HCl) is flowed along flow path 2, though second capture cartridge 126, through first capture cartridge 116 and into source container 104. As recovery solvent flows through second capture cartridge 126 and through first capture cartridge 116, it removes thorium from the columns, transporting it into source container 104. The recovery solvent is selective in removing thorium from second capture cartridge 126 and first capture cartridge 116 and leaving bismuth on the cartridges, leading to enriched/purified thorium in source container 104. FIG. 6B also illustrates solvent container 196 containing storage solvent (shown here as concentrated nitric acid (HNO$_3$)). Storage solvent is flowed from solvent container 196 along flow path 3 into source container 104 containing recovered thorium. FIG. 6A and FIG. 6B illustrate (see flow path 2 arrow direction) recovery solvent in solvent container 192 flowing from the "bottom" or second end of second capture cartridge 126 to the "top" or first end of second capture cartridge 126 and then flowing to the "bottom" or second end of first capture cartridge 116 to the "top" or first end of first capture cartridge 116. Such directional flow may be advantageous in allowing reuse of components in flow paths or facilitating automation and reducing personnel exposure time to radionuclides in the systems. In some variations, recovery solvent flowing does not follow a pathway from the "bottom" or second end of cartridge 126 to the "top" or first end of second capture cartridge 126 and then from the "bottom" or second end of first capture cartridge 116 to the "top" or first end of first capture cartridge 116. For example, first capture cartridge

116 and second capture cartridge 126 can be separated and recovery solution flowed separately over each cartridge. Recovery solution could also be flowed in a top-down manner (from a top (first end) of a cartridge to a bottom (second end) of a cartridge). The recovered thorium can be decayed and resulting radium separated from it as described above. The decay and recovery process can be repeated many times (2 times, 3 times, 4 times, etc.).

Figure 6C:
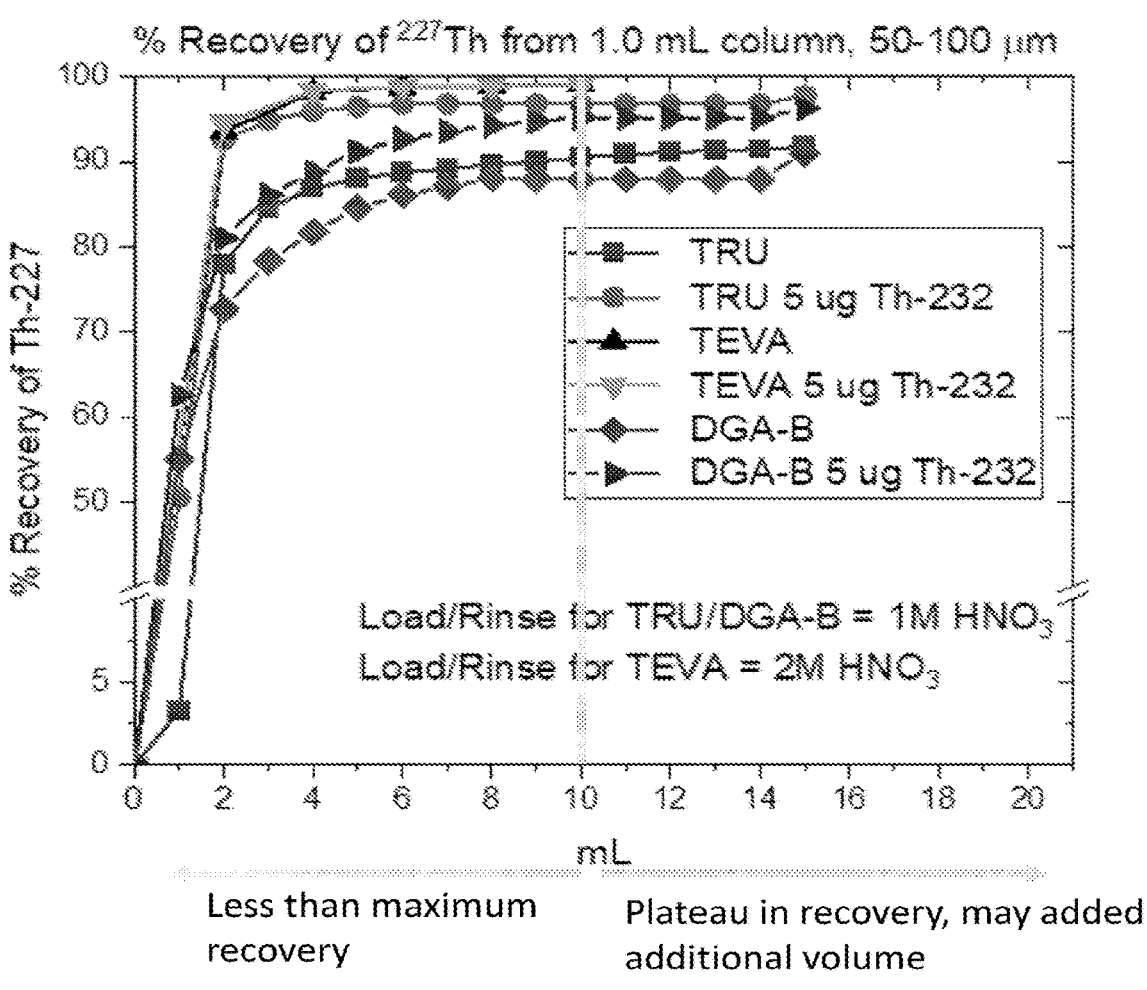
FIG. 6C shows that use of recovery systems and methods described herein resulted in radioactive thorium recovery at useful concentrations.

FIG. 6C shows that use of recovery systems and methods described herein resulted in excellent radioactive thorium recovery at useful concentrations. FIG. 6C illustrates results from experiments analyzing recovery of radioactive thorium from capture cartridges illustrated in the system and method shown in FIGS. 6A-6B using different concentrations of acid. Using these methods more than 95% of thorium loaded onto cartridges was recovered. Using a smaller volume of recovery solution generated more than 20%, more than 50%, more than 60%, more than 70%, more than 80%, or more than 90% thorium recovery using various resins (e.g., TEVA, TRU, DGA-B).

Figure 7:
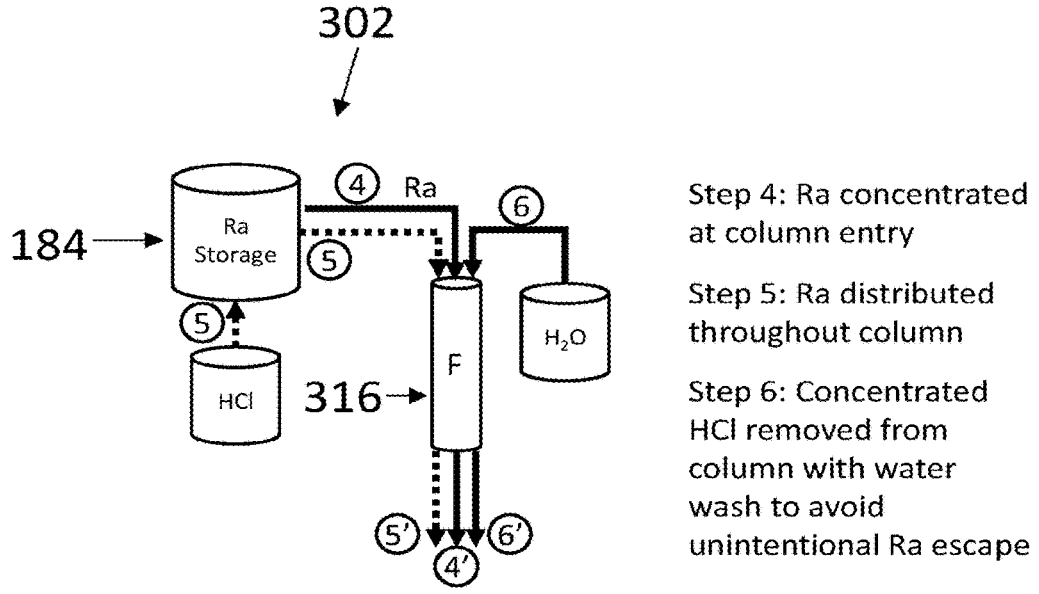
FIG. 7 schematically illustrates a method and system for setting up a $^{212}$Pb generator for generating $^{212}$Pb from previously separated (purified) $^{224}$Ra. $^{224}$Ra is loaded onto a generator column (column F) and subsequently distributed along the column using the methods described herein. $^{224}$Ra distribution along the generator column can minimize column destruction due to radioactive damage, facilitating reuse of the column, minimizing waste, and improving costs.
Figures 8A, 8B, 8C, 8D:
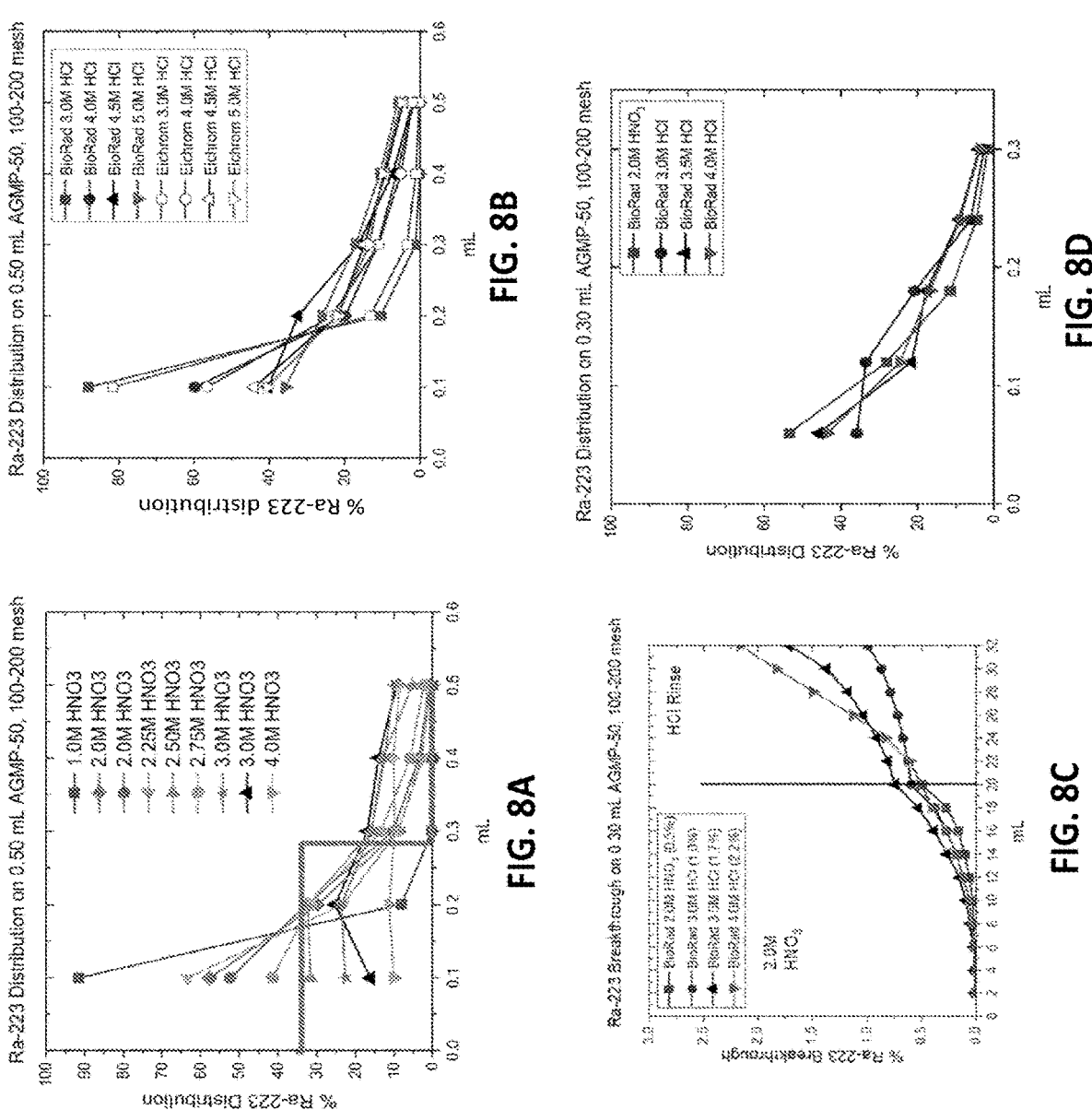
FIGS. 8A-8D show distribution of radioactive along the length of a column which can be used for reducing column damage and increasing column re-usability.

FIG. 7 schematically illustrates a system and method for setting up a $^{212}$Pb generator for generating $^{212}$Pb from $^{224}$Ra (e.g., from previously separated/purified $^{224}$Ra, as described above). FIG. 7 illustrates delivering separated/purified $^{224}$Ra from collection assembly 184 to lead generator cartridge 316 along flow path 4. Due to the relatively short half-life of $^{212}$Pb (about 10.6 hours), the generator containing the $^{224}$Ra is shipped to the medical facility so that the medical facility can harvest newly generated $^{212}$Pb from the column (and away from $^{224}$Ra) shortly after it forms and before it decays to a non-therapeutic form (e.g., $^{208}$Pb). As the $^{212}$Pb does not survive very long before decaying, if $^{212}$Pb could be harvested from the generator in multiple batches (lots), then a fresh supply of $^{212}$Pb would readily be available to the medical facility when its needed and over the course of many days. Unfortunately, intense energy from the $^{224}$Ra decay damages the resin in the cartridge, which could adversely impact $^{212}$Pb recovery efficiency and purity, limiting its use for $^{212}$Pb harvest. This energy damage process is referred to as radiolysis. Surprisingly, Applicant has found that use of acid treatment on the cartridge reduces radiolytic damage to the cartridge and allows $^{212}$Pb harvest from the cartridge over a longer period of time. FIG. 7 illustrates treatment of the lead generator cartridge 316 containing resin F and $^{224}$Ra with distribution solution (hydrochloric acid as an example), as illustrated by flow path 5 (dotted arrow in FIG. 7). Applicant observed that radium loaded onto a cartridge (lead generator cartridge 316 containing resin F) is more concentrated near the top part of column, closest to column entry, and that treating the cartridge with a distribution solution, such as hydrochloric acid, leads to better distribution of radioactive radium along the length of the cartridge. $^{224}$Ra distribution along the generator column can minimize column destruction due to radiolytic damage, facilitating harvesting multiple lots of $^{212}$Pb, allowing reuse of the column, minimizing waste, and improving costs. The distribution solution can be passed into collection assembly 184 prior to lead generator cartridge 316 treatment to, for example, remove residual $^{224}$Ra from collection assembly 184 or for convenience to facilitate automation. FIG. 7 at flow path 5' shows distribution solution flow-through removed from lead generator cartridge 316 and resin F. It is understood that distribution solution likely reduces binding between $^{224}$Ra and resin F and if distribution solution remains on lead generator cartridge 316, $^{224}$Ra may unintentionally be removed from resin F. Removal of $^{224}$Ra could lead to loss or contamination. Applicant has found that treating lead generator cartridge 316 and resin F with a stabilization solution after distribution solution treatment to remove distribution solution and replace it with stabilization solution can stabilize $^{224}$Ra on lead generator cartridge 316 and resin F. FIG. 7 illustrates treatment of the lead generator cartridge 316 containing resin F and $^{224}$Ra with stabilization solution (water as an example), as illustrated by flow path 6 (solid arrow in FIG. 7). Excess stabilization solution flows through (flow path 6'). Examples of distribution solutions useful for distributing radionuclide ($^{224}$Ra) on a cartridge and resin include acid, such as an oxoacid (e.g., HClO, $HNO_3$, $H_3PO_4$) or a hydrohalic acid (e.g., HCl, HBr, and HI). Nitric acid ($HNO_3$) and hydrochloric acid (HCl) are readily available and of interest. In some embodiments, a distribution solution includes a nitric acid concentration not more than about 2.25 M (e.g., not more than 2.25 M, not more than 2.0 M, not more than 1.5 M, not more than 1.0 M, etc.). In this and other embodiments, a volume of not more than about 20 mL (not more than 18 mL, not more than 16 ml, not more than 14 ml, not more than 12 mL, not more than 10 ml, etc.) can be used for as a distribution solution on a 0.5 ml cartridge. In some embodiments, a distribution solution includes a hydrochloric acid concentration of not more than 4.0 M HCl (not more than 3.5 M HCl, not more than 3.0 M HCl, not more than 2.5 M HCl, not more than 2.0 M HCl. In this and other embodiments, a volume of not more than about 10 mL (not more than 8 mL, not more than 6 ml, not more than 4 ml, not more than 2 mL, etc.) can be used for as a distribution solution on a 0.5 ml cartridge. FIGS. 8A-8D show distribution of radioactive along the length of a column which can be used for reducing column damage and increasing column re-usability. FIGS. 8A-8D show experimental results from analyzing radioactive nuclides from columns handled using the methods illustrated in FIG. 7. FIG. 8A shows conditions useful for controlling distribution of radioactive radium along the length of a 0.5 mL generator column, such as the one illustrated in FIG. 7. FIG. 8B shows conditions useful for preventing break-through (loss) of radioactive radium from a 0.5 mL generator column, such as the one illustrated in FIG. 7. Note that in FIGS. 8A-8B, replicates of some conditions (e.g., 2.0 M $HNO_3$, 3.0 M $HNO_3$) are included.

Figure 9:
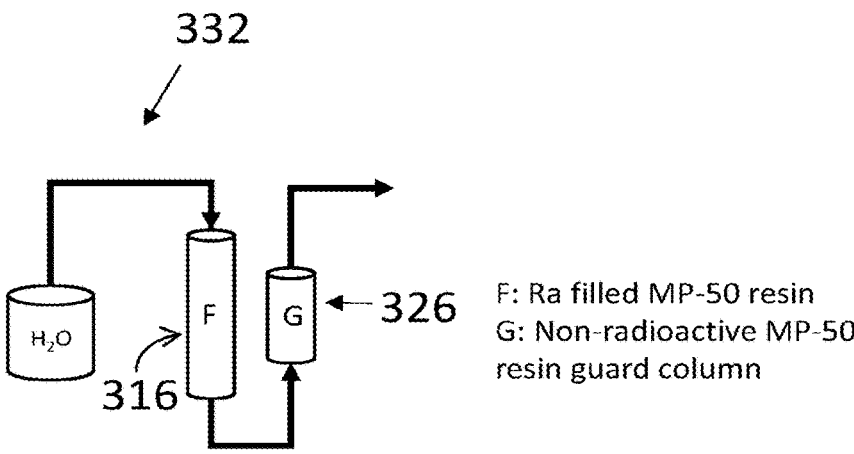
FIG. 9 schematically illustrates use of a guard column (column G) to minimize loss of radioactive radium from a lead generator cartridge (cartridge F), such as the lead generator cartridge illustrated in FIG. 7.

$^{212}$Pb obtained using the systems and methods herein is a therapeutic product. Contamination of separated/purified $^{212}$Pb with $^{224}$Ra may be dangerous. Use of distribution solution and distributing $^{224}$Ra along the lead generator cartridge 316 and resin F or other factors may lead to unwanted $^{224}$Ra breakthrough contaminating a $^{212}$Pb therapeutic product. Applicant has also found that addition of a non-radioactive column to lead generator cartridge 316 and resin F can be beneficial. FIG. 9 schematically illustrates addition of guard cartridge 326 with resin G to the bottom of lead generator cartridge 316 and resin F. For many medical purposes, it is important that the therapeutic $^{212}$Pb be sufficiently separated/purified not contain unwanted substances. If the $^{212}$Pb can be removed from the column without removing unwanted substances, sufficiently separated/purified $^{212}$Pb can be obtained. FIG. 8C shows conditions for preventing breakthrough (loss) of radioactive radium from a 0.3 mL generator column, such as the one illustrated in FIG. 7. FIG. 8D shows conditions useful for controlling distribution of radioactive radium along the length of a 0.3 mL generator column, such as the one illustrated in FIG. 7. Radioactive distribution along the length of a column can reduce column damage and improve column re-usability.

Figure 3:
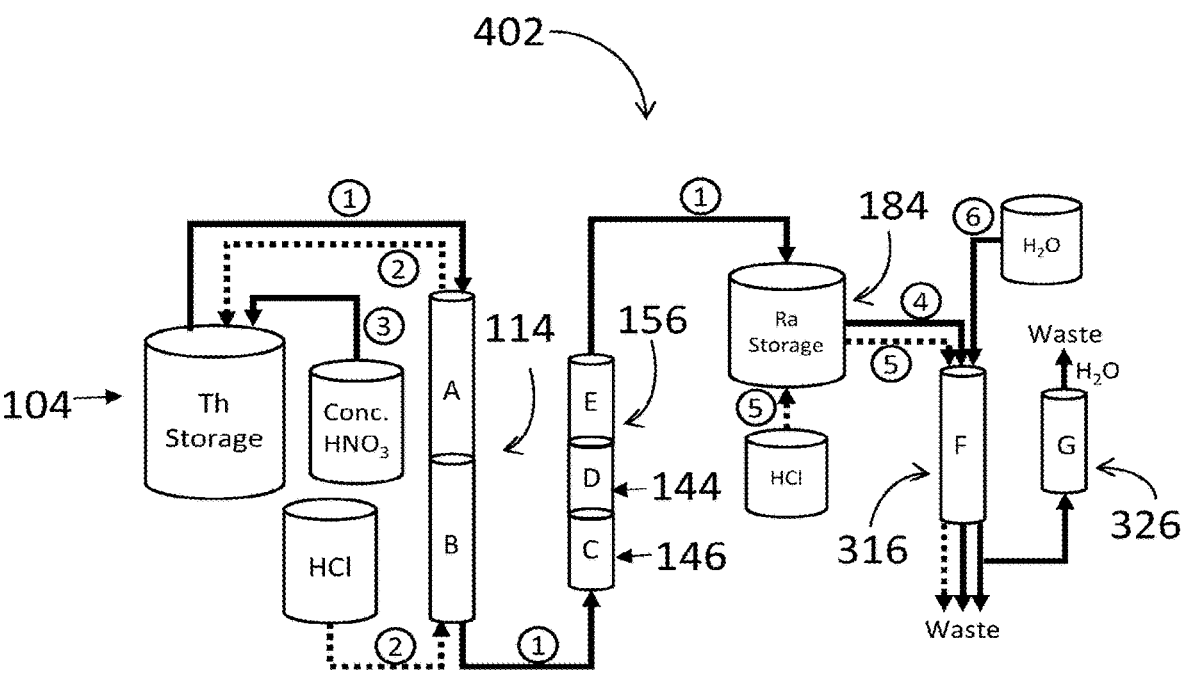
FIG. 3 illustrates a schematic view of another radioisotope generator manufacturing systems and subsystems.

FIG. 7 schematically illustrates Ra-224 is loaded onto lead generator cartridge 316 in system 302. Ra-224 is loaded in a solution of such as an oxoacid (e.g., HClO, HNO$_2$, H$_3$PO$_4$). In particular examples, pre-conditioning is performed with solvent having at least 1M HNO2 or solvent having at least 2M HNO$_3$. Lead generator cartridge 316 includes resin F with affinity for Ra-224. Resin F can be a cation exchange resin, such as macroporous matrix of poly-styrene/divinylbenzene onto which sulphonic groups —SO$_3$H are grafted. In some particular examples, resin 318 can be MP-50 or AG™ MP-50 (Bio-Rad Laboratories, Hercules, CA) as shown in FIG. 3.

Figure 10A:
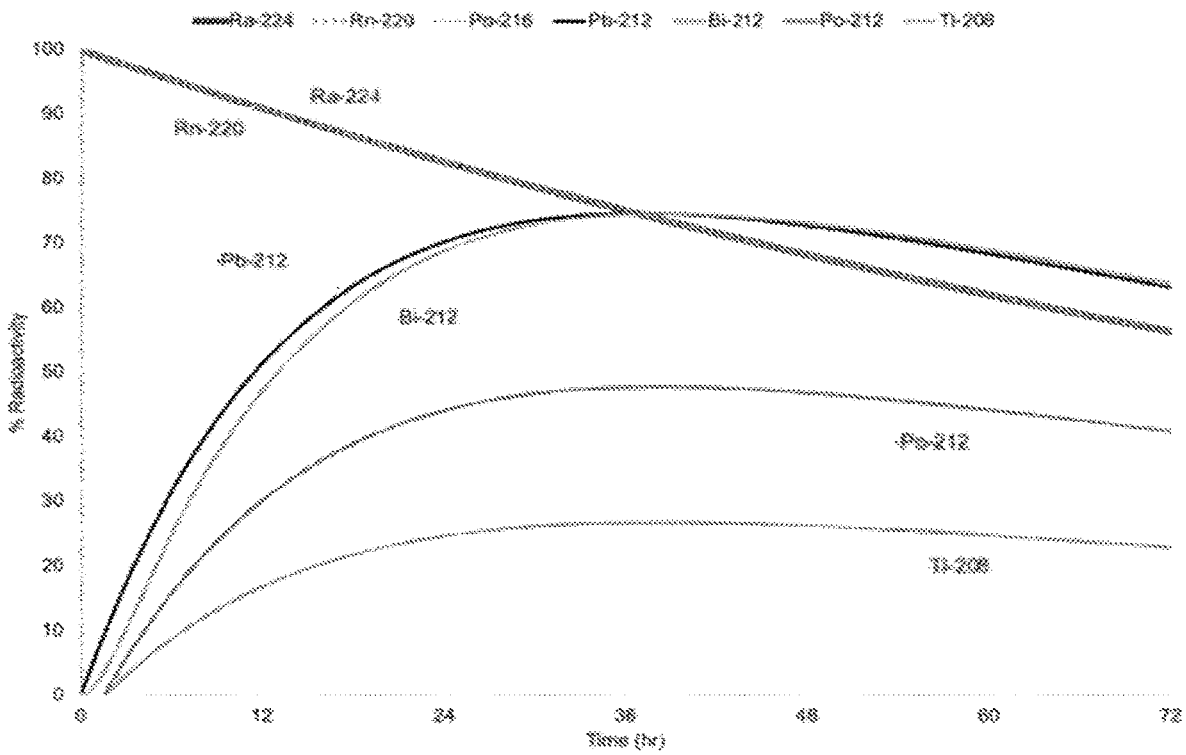
FIG. 10A is a graph demonstrating the timeline of $^{224}$Ra decay and resulting in-growth of $^{212}$Pb and other daughter radionuclides in a generator column such as shown in FIG. 9. These column decay and ingrowth characteristics allow for collection of multiple aliquots (e.g., lots) of $^{212}$Pb over time, as it is generated.

FIG. 9 schematically illustrates system 332 with addition of guard cartridge 326 (also referred to herein as a guard column) along with lead generator cartridge 316. Guard cartridge 326 may be especially useful to catch any Ra-224 that escapes from lead generator cartridge 316. After Ra-224 is loaded onto lead generator cartridge 316, lead generator cartridge 316 and guard cartridge 326 may be filled with water to prepare the cartridge series for storage and shipping. Water may advantageously prevent radon escape and may minimize radiolytic damage to the resins in lead generator cartridge 316 and guard cartridge 326. FIG. 10A is a graph demonstrating the timeline of $^{224}$Ra decay and resulting in-growth of $^{212}$Pb and other daughter radionuclides in a generator column such as shown in FIG. 9. These column decay and ingrowth characteristics allow for collection of multiple aliquots (e.g., multiple lots) of $^{212}$Pb over time, as it is generated.

Figures 10B, 11A, 11B:
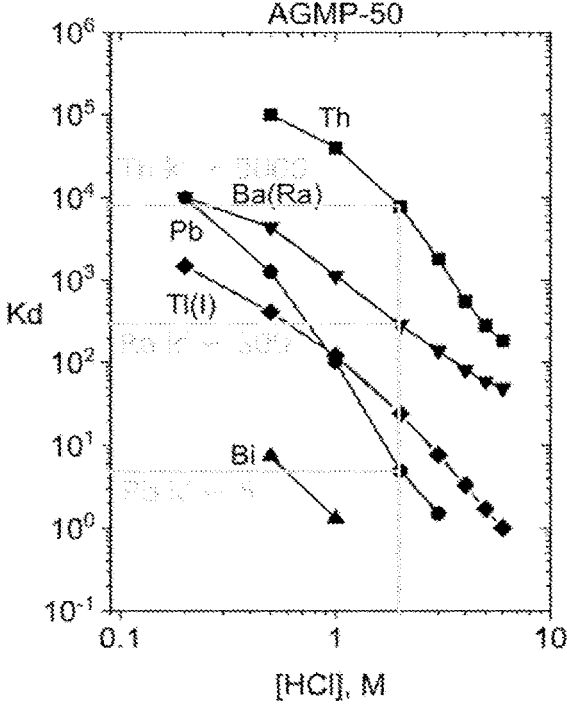
FIG. 10B shows that different nuclides have different affinities for an MP-50 column. The different nuclides can be separated from one another based on the different affinities.
FIG. 11A shows results from experimental analyses of multiple batches of radium obtained from radioactive thorium using the systems and methods (e.g., FIG. 2) described herein showing excellent $^{224}$Ra yield and purity.
FIG. 11B shows results from experimental analyses of multiple batches of radium obtained from radioactive thorium using the systems and methods (e.g., FIG. 3) described herein showing excellent $^{224}$Ra yield and purity.

FIG. 10B shows that different nuclides have different affinities for an MP-50 column. The different nuclides can be separated from one another based on the different affinities. FIG. 10C shows results from a distribution constants (Kd) analysis for different radionuclides on an MP-50) generator column as a function of different concentrations of hydrochloric acid (HCl). The differing distribution constants allow for selective collection of Pb-212 and its daughters from the generator MP-50 column while Ra-224 remains trapped within the generator MP-50 resin in the column.

FIG. 11A shows results from experimental analyses of multiple batches of radium obtained from radioactive thorium using the systems and methods (e.g., FIG. 2) described herein showing excellent $^{224}$Ra yield and purity. FIG. 11B shows results from experimental analyses of multiple batches of radium obtained from radioactive thorium using the systems and methods (e.g., FIG. 3) described herein showing excellent $^{224}$Ra yield and purity.

FIG. 11C shows results from experimental analyses of multiple batches of radium obtained from radioactive thorium using the systems and methods (e.g., FIG. 2) described herein showing low levels of breakthrough of radioactive $^{224}$Ra. FIG. 11D shows results from experimental analyses of multiple batches of radium obtained from radioactive thorium using the systems and methods (e.g., FIG. 3) described herein showing excellent $^{224}$Ra yield and purity.

FIG. 11E shows results from experimental analyses of multiple batches of radium obtained from radioactive thorium using the systems and methods (e.g., FIG. 2) described herein showing high $^{212}$Pb elution efficiency. FIG. 11F shows results from experimental analyses of multiple batches of radium obtained from radioactive thorium using the systems and methods (e.g., FIG. 3) described herein showing high $^{212}$Pb elution efficiency.

Figure 12A:
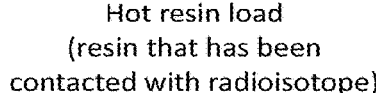
FIGS. 12A-12B show systems useful for distributing $^{224}$Ra onto generator cartridges.
Figure 12A:
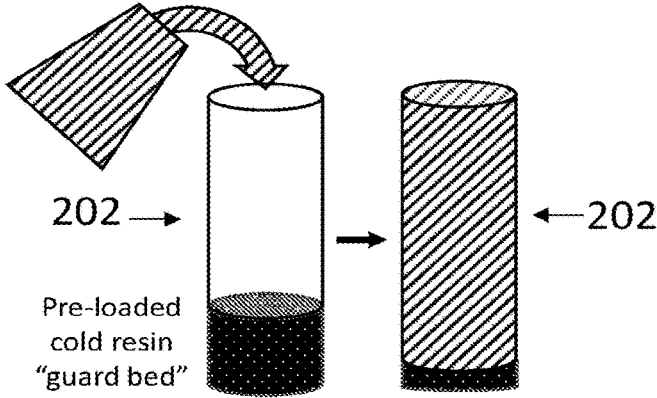
Figure 12B:
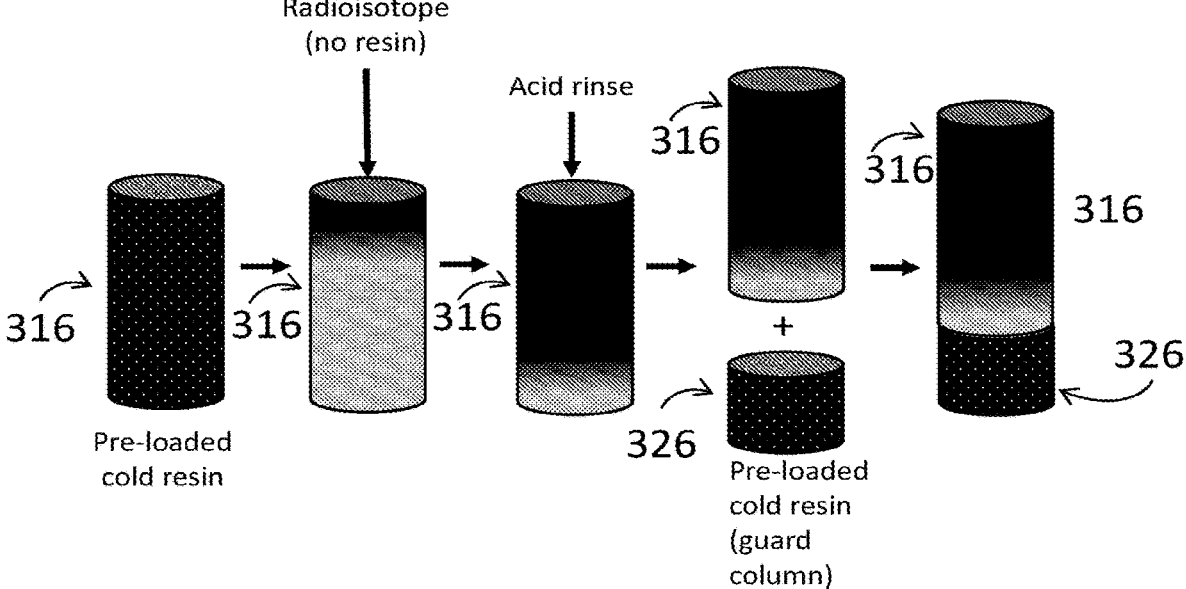

FIGS. 12A-12B show systems useful for distributing $^{224}$Ra onto generator cartridges. FIG. 12A schematically illustrates a "hot resin" loading method in which resin containing "hot" (radioactive) material is loaded onto a cartridge that contains cold resin at the bottom.

FIG. 12B show a "liquid loading" method in which a "hot" (radioactive) solution is loaded onto a cartridge that has been pre-filled with "cold" (non-radioactive) resin. "Hot" resin is not loaded. A guard column with "cold" (non-radioactive) resin is added in line.

Figure 13:
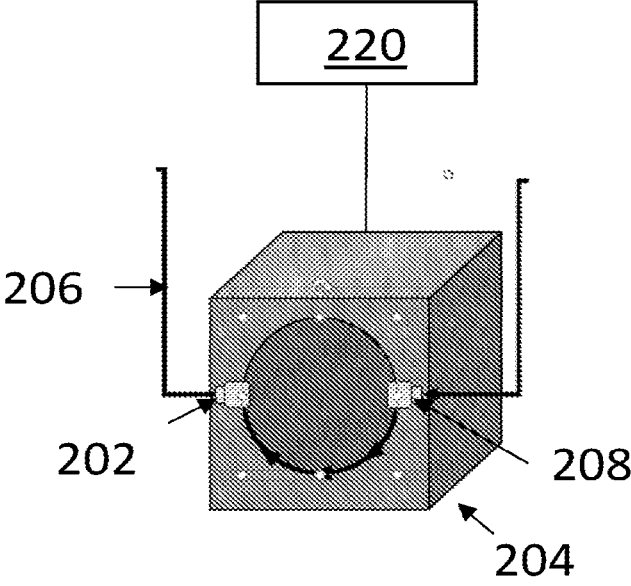
FIG. 13 schematically illustrates a controller and connectors that can be used in the systems and methods disclosed herein.

FIG. 13 schematically illustrates a controller and connectors that can be used in the systems and methods disclosed herein. Manufacturing generator system 2 or other systems or subsystems may contain one or more connectors. FIG. 13 schematically illustrates connector 202. Connector 202 can include a luer connector (e.g., Luer-Lok) or other structure useful for connecting two conduits 206 or other structures and allow easy attachment and detachment of different elements. Connector(s) 202 can be included in any system herein to connect various elements (e.g., assemblies, conduits, containers, and cartridges). Connectors may be configured to allow or control fluid flow between different elements.

Manufacturing generator system 2 or other systems or subsystems may contain one or more than one valves (e.g., one-way valve, two-way valve, three-valve). FIG. 13 schematically illustrates valve 208.

Manufacturing generator system 2 or other systems or subsystems may contain one or more pump assemblies. FIG. 13 schematically illustrates pump assembly 204. Pump assembly 204 can be configured to create a partial vacuum or a pressure through one or more flow paths (e.g., one or more of flow paths 1-6). A pump may be a positive displacement pump, such as a peristaltic pump, may be programmable, etc., such as available from Chemyx Inc. (Stafford, TX).

FIG. 13 schematically illustrates a controller 220. Pump assembly 78 can further include a controller configured to control a pump partial vacuum or pressure. In some examples, the system is under control of a control so that, upon activation, the radioactive source 106 is drawn through the system 2 automatically (e.g., without intervention). Such a system may, for example, advantageously reduce personnel exposure to system radioactivity. A pump assembly or other assembly may include an onboard computer or connector to a non-onboard computer (a remote computer). A computer can include a power source, hardware, and/or software. A computer can include or more central processing units including memory units, arithmetic logic unit, control unit, computer storage. A computer can include a graphical user interface (e.g., a touchscreen or other integrated user interface software) and/or other input devices (camera, joystick, keyboard, mouse, etc.) for data input. A computer may include one or more output devices, such as a monitor, a printer, a speaker. In some embodiments, system or subsystem includes a processor(s) configured to e.g., control the pump, ports for control of valves, etc.

Manufacturing generator system 2 or other systems or subsystems may include one or more protective elements, such as a protective shield. A shield can be configured to reduce personnel exposure to radioactivity and can cover or otherwise shield part or all of any of the systems, subsystems, or assemblies herein.

For example, thorium separation assembly in manufacturing generator system 2 in FIG. 5 includes first capture cartridge 116 with resin A and second capture cartridge 126 (which may also be referred to herein as a guard column) with resin B and third capture cartridge 146 with resin C. Resin A, resin B, and resin C can be the same resin or resin A can be different from resin B and/or resin C and resin B can be the same or different from resin C. Resin A and/or resin B and/or resin C can be cation exchange resins, such as aliphatic quaternary amine or octylphenyl-N,N-di-isobutyl carbamoylphosphine oxide (abbreviated CMPO) dissolved in tri-n-butyl phosphate (TBP) or DGA (Normal) (N,N,N',N'-tetra-n-octyldiglycolamide)), or DGA (Branched) (N,N,N',N'-tetrakis-2-ethylhexyl-diglycol-amide). Resin A and/or resin B and/or resin B can be, for example, TEVA resin, TRU resin, Eichrom RE resin, or DGA (N(Normal) and/or B(Branched) resin (Eichrom; Lisle, IL, USA). Resin A and/or resin B and/or resin C may be any particle size effective for separation, such as from 20 μm-50 μm, 50 μm-100 μm, or 100 μm-150 μm. In a particular example, the particle size in resin A and resin B are 50 μm-100 μm. In a particular example, the particle size in resin A, resin B, and resin C are 50 μm-100 μm In a particular example, resin A includes Eichrom TEVA resin and resin B includes Eichrom TRU resin. In some examples, each of resin A and resin B (and resin C) can absorb (trap) at least 99.00%, at least 99.50%, at least 99.99%, at least 99.999% of thorium-228, and/or each of resin A and resin B (and resin C) can absorb (trap) at least 99.00%, at least 99.50%, at least 99.99%, at least 99.999% of bismuth-212, and/or each of resin A and resin B and/or resin C can absorb (trap) at least 99.00%, at least 99.50%, at least 99.99%, at least 99.999% of thallium-208. Use of distinct (e.g., separate) cartridges for the resin A, resin B, and resin C can lead to greater removal of unwanted isotopes (e.g., thorium-228, bismuth-212, thallium-208) than use of only one cartridge. Use of distinct (e.g., separate) cartridges for the resin A and resin B (and resin C) may lead to less than 0.01% break-through of isotopes (e.g., thorium-228, bismuth-212, thallium-208), less than 0.001%, less than 0.0001%, or less than 0.00001% breakthrough of isotopes (e.g., thorium-228, bismuth-212, thallium-208). Use of first capture cartridge 116 and resin B (in addition to cartridge 114 and resin A) can provide insurance in the event that first capture cartridge 116 or resin B fail (e.g., due to bad batch) such that an entire lot of radioactive material is not lost and can be salvaged for further use. Distinct cartridges may be distinct as separated by a neck region, such as a neck region about 1 mm-5 mm in diameter (such as less than 1 mm, less than 2 mm, less than 3 mm, less than 4 mm, less than 5 mm) and/or may have a diameter ½, ⅓, ¼, ⅕ as large as a cartridge diameter. Distinct cartridges may be configured to be reversibly separable and joinable. Distinct (e.g., separate) cartridges may be connected by a male-female luer-lock, luer slip, etc. A luer-lock or luer-slip opening (inner diameter) between the cartridges may be about 2 mm-5 mm in diameter (such as less than 2 mm, less than 3 mm, less than 4 mm, less than 5 mm) and may have a diameter ½, ⅓, ¼, ⅕ as large as a cartridge diameter.

Lead capture cartridge 144 includes resin D (e.g., lead separation resin with a high affinity for lead-212. Resin D can be, for example 40% (w:w) crown ether or <40% (w:w) crown ether, such as Sr resin or Pb resin (Eichrom; Lisle, IL, USA). In some embodiments, crown ether is 18-crown-6 ether and a resin (resin D) can be 40% (w:w) 18-crown-6 or <40% (w:w) 18-crown-6. The resin may be any particle size effective for separation, such as from 20 μm-50 μm, 50 μm-100 μm, or 100 μm-150 μm. In a particular example, the particle size is 50 μm-100 μm. FIG. 3 illustrates a particular examples of a separation cartridges that can be used to separate different radioactive nuclides and to change solutions, such as in the radioisotope generator manufacturing systems illustrated in FIGS. 2 and 3 and elsewhere herein. In some examples, resin D can absorb (trap) at least 99.00%, at least 99.50%, at least 99.99%, at least 99.999% of lead-212. Use of resin D in lead capture cartridge 144 may lead to less than 0.01% breakthrough of isotope (e.g., lead-212), less than 0.001%, less than 0.0001%, or less than 0.00001% breakthrough of isotopes (e.g., lead-212).

Organic or pre-filter cartridge 156 includes resin E. Organic or pre-filter cartridge 156 can be used to remove (trace) amounts of organic compounds from aqueous solutions so as to obtain a sufficiently purified product safe for e.g., human use. Resin E can include an uncoated, inert polymeric support, such as, for example, Pre-Filter resin, Eichrom; Lisle, IL, USA. Resin E may have any particle size effective for removing trace amounts of organic compounds, such as particle sizes from 20 μm-50 μm, 50 μm-100 μm, or 100 μm-150 μm. In some examples, Resin E is configured to absorb (trap) at least 99.00%, at least 99.50%, at least 99.99%, at least 99.999% of organic compounds.

The generator system 102 can include a plurality of subsystems, such as a thorium-radium separation subsystem, a thorium recovery subsystem, a lead generator subsystem, etc. Any of the components in generator system 102 (including any in FIG. 2 or otherwise described herein) may be part of a subsystem in generator system 102 or may be part of a separate (stand-alone) system. FIG. 3 illustrates another example of generator system 402 with separation cartridges that can be used to separate and store different radioactive nuclides. Generator system 402 illustrated in FIG. 3 is similar to generator system 102 illustrated in FIG. 2, except that generator system 102 includes an additional capture cartridge, cartridge 146. Except where context indicates otherwise (particularly with regards to cartridge 146), description herein of generator system 102 applies to generator system 402 and description herein of generator system 102 applies to generator system 402. Cartridge 146 is configured to reduce an amount of at least one or both of $^{228}$Th and $^{212}$Bi from solutions passing through, so as to obtain a sufficiently purified radionuclide (Ra) safe for e.g., human use. Cartridge 146 may contain resin C, a resin configured to reduce an amount of at least one or both of $^{228}$Th and $^{212}$Bi from solutions passing through. Resin C is configured to absorb (trap) an amount of at least one or both of $^{228}$Th and $^{212}$Bi from solutions passing through. Resin C may reduce an amount of least one or both of $^{228}$Th and $^{212}$Bi by at least 100×, at least 500×, at least 1000×, at least 1500×, at least 5000×, or more from a first end to a second end of cartridge 146. Resin C may be, a chelating ion exchange resin, such as for example, Monophos resin, Diphonix® resin, or Diphosil resin (Eichrom Technologies, Lisle, IL, USA). As even small amounts of contaminating $^{228}$Th can be harmful, reduction of the amount of $^{228}$Th in a Ra product can be very beneficial. In some cases, even extremely low Th-228 impurity levels may trigger licensing restrictions at sites receiving purified Ra-224 that prevent, reduce, or complicate product use. Reducing an amount of $^{228}$Th in a Ra product through the use of one (or more than one) Resin C columns can improve the quality of a Ra product for medical applications. Resin C may be a Diphonix® resin and/or variations having a polymeric support which has been functionalized with diphosphonic and sulphonic acid groups. Resin C may be a diphosil resin based on diphosponic acid groups grated onto a surface support such as a silica resin. Resin C may be Monophos resin and/or variations, based on a polymeric support (such as polystyrene-DVB support) functionalized with mono-phosphonic acid. Purolite resin (Purolite S957; Poly-sciences, Warrington, PA) is a mixed acid cation and chelating monophos resin, which incorporates phosphonic and sulfonic functional groups in a polymeric support.

FIGS. 4A-4B and 5 illustrate steps using manufacturing generator system 402 (subsystem 403) for separation of radium-224 (Ra-224 or $^{224}$Ra) from other components present during $^{228}$Th radioactive decay to obtain a sufficiently purified radium-224 product. FIG. 4A schematically illustrates a system for an in-line process with a series of separation cartridges for separating $^{224}$Ra and $^{212}$Pb from other components. In FIG. 4A, subsystem 403 is set-up and pre-conditioned (rinsed with a solvent) to test and confirm overall system performance and to test for leaks. In general, pre-conditioning may be performed with the same solvent as that of the radioactive source (e.g., minus the radioactive materials) that will be loaded into the system. Pre-conditioning may be performed with a strong acid, such as a hydrohalic acid (e.g., HF, HCl, HBr, and HI) or an oxoacid (e.g., carbonic acid $H_2CO_3$), carboxylic acid (HClO), nitric acid ($HNO_3$), phosphonic acid $H_3PO_3$), phosphoric acid ($H_3PO_4$), pyrophosphoric acid ($H_4P_2O_7$), sulfonic acid ($SO_3H$), or sulfuric acid ($H_2SO_4$). In particular examples, pre-conditioning is performed with solvent having at least 0.1M $HNO_3$ or solvent having at least 2M $HNO_3$. The pre-conditioning solvent is placed into source container 104 and drawn through the system and collected into a waste container. The pre-conditioning solvent is removed and a clean or fresh collection container 184 is placed in the system. The clean or fresh collection container 184 can collect $^{224}$Ra for further use. After pre-conditioning, radioactive source 106 is loaded into the system to separate nuclides in the solution as illustrated in FIG. 4B. Radioactive source 106 contains thorium-228, radium-224, lead-212, bismuth-212, and thallium-208. Radioactive source 106 may be a strong acid solution, such as an oxoacid. In particular examples, radioactive source 106 is in a solution having at least 0.5M $HNO_3$. FIG. 4B schematically illustrates manufacturing generating system 402 for separating nuclides with $^{228}$Th, $^{212}$Bi, and $^{208}$Tl captured by first capture cartridge 116, residual amounts of $^{228}$Th, $^{212}$Bi, and $^{208}$Tl captured by second capture cartridge 126, residual amounts of $^{228}$Th and $^{212}$Bi captured by third capture cartridge 146, $^{212}$Pb captured by lead capture cartridge 144, and contaminating organic materials capture by pre-filter cartridge 156. $^{224}$Ra flows through and can be collected in collection container 184. Thus, the $^{224}$Ra product is substantially free of $^{228}$Th. In some embodiments, the first capture cartridge is a TEVA cartridge, and the second capture cartridge is a TRU cartridge.

After the radionuclides are separated, a rinse step is performed. Source container 106 is washed to ensure radioactivity has been removed and flowed through the system. Rinsing also moves residual Ra-224 along the system and into collection chamber 184. Rinsing can be performed with the same concentration acid solution as in radioactive source solution, such as an oxoacid (e.g., HClO, $HNO_2$, $H_3PO_4$). In particular examples, rinsing is performed with solvent having at least 0.5M $HNO_3$ or solvent having at least 2M $HNO_3$.

FIGS. 6A-6B schematically illustrate system 202 and method useful for recovery of Th-228 from first capture cartridge 116 and second capture cartridge 126. Th-228 is separated from daughter nuclides Bi-212 and Tl-208. FIG. 6A schematically illustrates setup of system 202 for recovery of $^{228}$Th that includes reversing the direction of fluid flow relative to the originally flowed radioactive source.

FIG. 6B schematically illustrates separation (recovery for recycling/reuse) of Th-228 away from other nuclides using the system shown in FIG. 6A. Conduits and connections are switched to obtain negative pressure flow. Container 192 is filled with acid. Collection container 86 may be pre-filled with a volume of acid so that the final concentration of acid in source container 104 is 2M (Source container 104 can be pre-loaded with 1.5 mls 70% $HNO_3$ so that the final concentration of acid in collection container 86 is 2M $HNO_3$). FIG. 6C shows a graph of results from experiments analyzing recovery of Th-227 from cartridges shown in FIGS. 6A-6B. Recovery conditions were developed to obtain desired amounts of Th-228 recovery at desired concentrations.

Any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like.

Experimental

FIG. 4C and FIG. 6C: Three potential primary Th separation columns (PTSC) were initially evaluated using Th-227 ($T_{1/2}$=18.697 days) to optimize conditions where Th decontamination of the Ra fraction and Th recovery in dilute acid were highest. The two parameters that were initially evaluated were the breakthrough of Th during loading and rinsing of the potential resins and the percent recovery of the Th using 14 mL of 0.1M HCl (FIG. 4C).

The PTSC resins (50-100 μm) were packed into Supelco 1 mL empty fritted SPE tubes (4.2 cm column length, 0.55 cm inner diameter, part no. 54220-U) and capped with a Value Plastics $^{5/32}$" barbed female luer fitting (part no. FTLL240-6005). The columns were preconditioned with 5 mL of 1-2 M $HNO_3$, loaded with 12 mL of 1-2M $HNO_3$ containing Th-227, and rinsed with 8 mL of 1-2M $HNO_3$. The column was then inverted, and the Th-227 was recovered with 0.1M HCl, eluting the column in the reverse direction to the load and rinse steps. Stripping the columns in the reverse direction allows for recovery of the Th more completely in a lower volume of 0.1M HCl. Aliquots of the elution were collected in 5 mL polypropylene gamma tubes and measured for Th-227 (236.0 keV, 12.3%) on a high-purity germanium (HPGe) gamma detector. All three resins exhibited promising Th retention and recovery characteristics. Due to the short half-life of Th-227, the Th-227 is present at a much higher specific activity than a corresponding radioactivity of Th-228. The high specific activity Th-227 can be more sensitive than Th-228 to adsorption on trace impurities in the extractants of the EXC resins and ion exchange sites on the column and vial walls. The elution behavior was, therefore, studied with Th-227 only and with Th-227+5 μg of Th-232 to mimic the mass of mCi quantities of Th-228. In general Th recovery improved with the additional Th mass due to the masking effect the extra mass has on trace impurities in the resin extractants and interactions with ion exchange sites on the column and resin materials. TEVA exhibited exceptionally low Th breakthrough in 2M $HNO_3$ and the highest recoveries of Th in dilute HCl. TEVA may benefit from use of 2M $HNO_3$ for efficient Th adsorption, while DGA-B and TRU resin exhibit high Th retention from 1M $HNO_3$. The higher $HNO_3$ concentration is not expected to have a negative impact on the Ra-224 retention on the MP-50 generator column.

FIGS. 8A-8B: (FIG. 8A) Ra distribution on MP-50 column under various nitric acid concentration conditions; (FIG. 8B) Ra distribution on MP-50 column after washing with hydrochloric acid; (C; bottom left) Ra breakthrough on MP-50 column after loading with 2 M nitric acid and washing with various hydrochloric acid concentrations.

A method for spreading the Ra radioactivity across the MP-50 generator column is to use different concentrations of $HNO_3$ and HCl. In this approach, higher $HNO_3$ or HCl concentrations move the Ra-224 down the MP-50 column while also spreading the Ra-224 radioactivity over a wider band of the column. The farther the Ra-224 is moved down the column, the wider the Ra-224 band becomes, however, the likelihood of losing Ra-224 off the bottom of the generator column also increases. Therefore, Ra-224 band spreading can be balanced to limit losses of Ra-224. The effect of $HNO_3$ and HCl concentration on the Ra-223 breakthrough and distribution on a 0.5 mL column of MP-50 (100-200 mesh, 4.5 cm length×0.4 cm i.d.) are presented in FIG. 8A-D Loading the generator in $HNO_3$ may be beneficial, since $HNO_3$ can be used for the separation of Th-228 and daughters from the Ra-224. Based on the breakthrough curves for $HNO_3$, the $HNO_3$ concentration may be kept below <2.25 M $HNO_3$ and the volume <20 mL to prevent significant breakthrough of Ra-224. The Pb-212 is eluted from the generator with 2M HCl. Rinsing the $HNO_3$ loaded generator with HCl will displace the $HNO_3$, preparing the generator for use, and spread the Ra-224 over the MP-50 column. Based on the HCl breakthrough curves, the generator rinse can be kept to <4M HCl and volume to <10 mL to prevent significant Ra-224 breakthrough. When a radioactive material is loaded onto a generator column, it can remain relatively near the top of the column, or it may spread towards the bottom of the column. Spread (e.g., from the first or top end of the generator column to the second or bottom end of the generator column) can be described by considering the generator column as containing five fifths or sections and describing how much radioactive material is present along the fifths of the generator column. The further radioactivity has spread, the more radioactivity would be located in the fourth fifth or bottom (fifth) fifth of the column. In some embodiments, after spreading, more than 5%, more than 10%, more than 15% or more than 20% of the radioactivity can be in the bottom fifth of the generator column. In some embodiments, after spreading, less than 5%, less than 10%, less than 15% or less than 20% of the radioactivity is in the bottom fifth of the generator column. After spreading, in some embodiments, more than 5%, more than 10%, more than 15% or more than 20% of the radioactivity can be in the fourth of the generator column (i.e., the fifth directly above the bottom fifth). After spreading, more than 5%, more than 10%, more than 15% or more than 20% of the radioactivity can be in fourth and fifth regions of the generator column. In some embodiments, after spreading, less than 5%, less than 10%, less than 15% or less than 20% of the radioactivity is in the fourth and fifth regions of the generator column. In some embodiments, after spreading, more than 5%, more than 10%, more than 15% or more than 20% of the radioactivity is in the fourth and fifth regions of the generator column. Any of these values may be combined. For example, in some embodiments, after spreading, more than 10% and less than 20% of the radioactivity is in the fourth and fifth regions of the generator column.

When preparing generators using a single 0.5 mL MP-50 column, higher than desired Ra breakthrough was observed due to Ra located in the bottom 40% of the column co-eluting with the Pb-212. This Ra can be captured by adding an additional guard column of 0.1-0.2 mL clean MP-50 resin below the generator column. However, this increased resin volume may require larger volumes of 2M HCl to efficiently recover the Pb-212. Therefore, additional Ra breakthrough and distribution experiments were performed using a 0.3 mL column of BioRad MP-50. During generator operation, the 0.3 mL generator column would be followed by a 0.1 mL guard column of clean MP-50 resin. In these experiments, the 0.3 mL generator columns were loaded from 20 mL of 2M $HNO_3$, simulating the matrix and maximum volume of Ra-224 after purification from Th-228 and daughters. The generator columns were then rinsed with 10 mL of 2.0-4.0 M HCl. Data for these experiments is presented in FIG. 8D. Using this configuration, adequate Ra-224 loading (98-99%) and distribution were achieved with 20 mL of 2.0M $HNO_3$ followed by 10 mL of 4.0M HCl.

FIG. 11A: Three generators were produced over a span of approximately three months using a Th-228 source in 12 mL of 2 M $HNO_3$ that had been allowed to produce sufficient levels of Ra-224 (e.g., >1 week since prior purification). The Ra-224 was extracted using the Th/Ra separation method previously described and loaded onto 0.3 mL MP-50 generator columns. The quality of the Ra-224 obtained at these radioactivity levels was consistent with what was observed at lower radioactivity levels (e.g., 1 mCi). The Th-228 content in the purified Ra-224 was measured at the time of manufacturing by use of a rapid QC procedure where any Th-228 in the purified Ra-224 fraction was concentrated onto a TRU column and daughters removed to allow for measurement via high purity germanium (HPGe) analysis. Th-228 was quantified by measuring the 215.98 keV gamma ray emitted by Th-228. To quantify the radioactivity, a gamma ray energy vs. counting efficiency curve was developed using a NIST traceable reference standard (Eckert & Ziegler, Germany). The Th-228 content was remeasured at least two months after the initial measurement. This subsequent measurement analyzed for the 215.9 keV gamma ray emitted by Th-228 but also included analysis for the 238.6 keV gamma ray emitted by Pb-212 and 240.98 keV gamma ray emitted by Ra-224. After two months of decay, the Th-228 source would re-establish equilibrium where the radioactivity of Pb-212 and Ra-224 would be equivalent to that of Th-228. The gamma rays emitted by Pb-212 and Ra-224 are 176× and 16× higher in intensity (Th-228=215.9 keV (I=0.247%); Ra-224=240.98 keV (I=4.1%): Pb-212=238.6 keV (I=43.6%)), which allow for lower detection limits to be established by using Pb-212 and Ra-224 to indirectly quantify the amount of Th-228. Thus, this data demonstrates the ability to consistently obtain highly pure Ra-224 that is relatively free of Th-228 using the developed method.

FIG. 11B: The performance of the three clinically relevant generators manufactured was established by analyzing the Ra-224 breakthrough (quantity of Ra-224 that escapes the column) and elution efficiency (% of Pb-212 collected relative to what is available). The generator was eluted by flushing of the generator columns with 4 mL of 2 M HCl at a rate of 2 mL per minute. Subsequently after, 1 mL of water was loaded into the generator for overnight storage. This water is collected during subsequent elutions. During each elution, a small quantity of Ra-224 may wash off the resin matrix. This parameter was tested for over a 14-day period after the generator was manufactured. Specifically, a minimum of 10 elutions were carried out during this period and Ra-224 breakthrough was monitored as a fraction of Ra-224 loaded onto the column (decay corrected to the time of elution). The Ra-224 was quantified by analyzing the 240.98 keV gamma ray via HPGe measurement. The measurements were carried out ≥5 days after the elution to allow for the Pb-212 to decay away ($T_{1/2}$=10.64 h) while only a fraction of Ra-224 decayed ($T_{1/2}$=3.6 d). The results from these studies demonstrate that the Ra-224 remains adsorbed to the MP-50 column allowing for highly pure Pb-212 to be consistently collected. Furthermore, this validates that the disclosed generator approach that includes a main column with Ra-224 adsorbed and a guard column results in highly pure Pb-212.

FIG. 11C: For each elution, the radioactivity of the eluate was quantified 4 hours after the eluate was collected. This was carried out to allow the Pb-212 to reach equilibrium with its progeny. The radioactivity was measured using a CRC-55tR (Capintec. New Jersey) dose calibrator where a NIST traceable dial setting for Pb-212 in equilibrium with its progeny had been previously established. The radioactivity was decay corrected for the time of elution and compared to the theoretical quantity of Pb-212 that should be present within the generator based on the generator Ra-224 quantity and the time allowed for Pb-212 to grow in. Results from these studies show that ≥90% of the Pb-212 available can be consistently collected.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:

a first cartridge having a first opening, a second opening, and a chamber therebetween comprising a first resin having affinity for thorium-228 and bismuth-212;

a second cartridge having a first opening, a second opening, and a chamber therebetween comprising a second resin having affinity for thorium-228, wherein the second resin is distinct from the first resin;

a third cartridge having a first opening, a second opening, and a chamber therebetween comprising a third resin having affinity for thorium-228 and bismuth-212, wherein the third resin is distinct from the second resin; and a fourth cartridge having a first opening, a second opening, and a chamber therebetween comprising a fourth resin having affinity for lead-212; and optionally further comprising a collection vial fluidically in line with a bottom of the fourth cartridge, wherein the collection vial comprises radium-224; and wherein a continuous flow path is formed from a top of the first cartridge though the second cartridge, through the third cartridge, and to the bottom of the fourth cartridge during system use.

2. The system of claim 1, further comprising a conduit configured to allow an acid flow from the second cartridge to the first cartridge and further to a source vial, wherein the source vial is fluidically connected to a top opening of the first cartridge.

3. The system of claim 1, wherein the first resin comprises an aliphatic quaternary amine, and preferably the first resin comprises TEVA resin; and/or wherein the second resin comprises octylphenyl-N, N-di-isobutyl carbamoylphosphine oxide (CMPO) dissolved in tri-n-butyl phosphate (TBP) or TRU resin, an ion exchange resin selected from N,N,N',N'-tetra-n-octyl-diglycolamide (DGA Resin, Normal) and/or N,N,N', N'-tetra-2-ethylhexyldiglycolamide (DGA Resin, Branched); and/or wherein the third resin comprises monophos resin; and/or wherein the fourth resin comprises Pb resin, Sr resin or crown ether dissolved in alcohol, optionally 18-crown-6 dissolved in alcohol.

4. The system of claim 1, wherein the first and/or second resin comprises particles of 50-100 μm.

5. The system of claim 1, further comprising a pump configured to create a partial vacuum or a pressure in the continuous flow path to draw a fluid from the top of the first cartridge through the bottom of the fourth cartridge, optionally further comprising a controller configured to control the pump partial vacuum or pressure.

6. The system of claim 1, further comprising a fifth cartridge in line at the bottom of the fourth cartridge, wherein the fifth cartridge comprises resin E having affinity for organic materials, and wherein resin E comprises an uncoated, inert polymeric support; and further comprising a collection vial fluidically in line with a bottom of the fifth cartridge, wherein the collection vial comprises radium-224.

7. The system of claim 6, further comprising a sixth cartridge, wherein the sixth cartridge is in line at the bottom of the fourth cartridge or the bottom of the fifth cartridge, or the sixth cartridge is not in line at the bottom of the fourth cartridge or the bottom of the fifth cartridge, wherein if the sixth cartridge is not in line at the bottom of the fourth cartridge or the bottom of the fifth cartridge, then the content of the collection vial from the fourth cartridge or the content of the collection vial from the fifth cartridge is to be loaded onto the sixth cartridge, wherein the sixth cartridge comprises a sixth resin having affinity for radium-224, and wherein the sixth resin comprises MP-50 resin.

8. The system of claim 7, further comprising a seventh cartridge, wherein the seventh cartridge is in line at a bottom of the sixth cartridge, wherein the seventh cartridge comprises a seventh resin having affinity for radium-224, and wherein the seventh resin comprises MP-50 resin.

* * * * *